US011613610B2

(12) United States Patent
Patil et al.

(10) Patent No.: US 11,613,610 B2
(45) Date of Patent: Mar. 28, 2023

(54) PROCESS FOR THE MANUFACTURE OF THERMOPLASTIC POLYMER PARTICLES, THERMOPLASTIC POLYMER PARTICLES PREPARED THEREBY, AND ARTICLES PREPARED THEREFROM

(71) Applicant: SABIC GLOBAL TECHNOLOGIES B.V., Bergen op Zoom (NL)

(72) Inventors: Rahul Patil, Evansville, IN (US); Zeljko Kuzeljevic, Evansville, IN (US); William E. Hollar, Jr., Mt. Vernon, IN (US); Viswanathan Kalyanaraman, Newburgh, IN (US); Mitchell Reynolds, Mt. Vernon, IN (US); Zachary Anderson, Evansville, IN (US)

(73) Assignee: SHPP GLOBAL TECHNOLOGIES B.V., Bergen op Zoom (NL)

( * ) Notice: Subject to any disclaimer, the term of this patent is extended or adjusted under 35 U.S.C. 154(b) by 477 days.

(21) Appl. No.: 16/620,624

(22) PCT Filed: Aug. 14, 2018

(86) PCT No.: PCT/US2018/046595
§ 371 (c)(1),
(2) Date: Dec. 9, 2019

(87) PCT Pub. No.: WO2019/040314
PCT Pub. Date: Feb. 28, 2019

(65) Prior Publication Data
US 2020/0199304 A1 Jun. 25, 2020

Related U.S. Application Data

(60) Provisional application No. 62/549,568, filed on Aug. 24, 2017.

(51) Int. Cl.
*C08J 3/14* (2006.01)
(52) U.S. Cl.
CPC .............. *C08J 3/14* (2013.01); *C08J 2369/00* (2013.01); *C08J 2379/08* (2013.01)

(58) Field of Classification Search
CPC ........... C08J 3/14; C08J 2367/00; C08L 79/08
See application file for complete search history.

(56) References Cited

U.S. PATENT DOCUMENTS

| 6,528,611 | B2 | 3/2003 | Vodermayer et al. |
| 9,181,395 | B2 | 11/2015 | Kalayaraman et al. |
| 10,377,863 | B2 * | 8/2019 | Kalyanaraman ... C08G 73/1053 |
| 2012/0245239 | A1 | 9/2012 | Kalyanaraman et al. |
| 2014/0272430 | A1 | 9/2014 | Kalayaraman |

FOREIGN PATENT DOCUMENTS

| WO | 2016134224 A1 | 8/2016 |
| WO | 2017003809 A1 | 1/2017 |
| WO | 2017004140 A1 | 1/2017 |
| WO | 2017040887 A1 | 3/2017 |

OTHER PUBLICATIONS

International Search Report for the corresponding PCT/US2018/046595; International Date of Filing: Aug. 14, 2018; dated Nov. 23, 2018; 5 pages.
Written Opinion for the corresponding PCT/US2018/046595; International Date of Filing: Aug. 14, 2018; dated Nov. 23, 2018; 9 pages.
"Dispersion Tools", IKA®—Werke GmbH & Co.KG; Ika.com website; 16 pages.
General Duty In-Line Mixer, Technical Data Sheet; Silverson; 1 page.

* cited by examiner

*Primary Examiner* — Gregory Listvoyb
(74) *Attorney, Agent, or Firm* — Cantor Colburn LLP

(57) ABSTRACT

A process for the manufacture of thermoplastic polymer particles include combining a first solution having a polyetherimide, a polycarbonate, or a combination thereof and an organic solvent with an aqueous solution including a surfactant, and agitating the resulting mixture using a shear force generating device operating at a preselected peripheral rotational speed to provide an emulsion. The emulsion is heated to remove the organic solvent and provide an aqueous polymer dispersion including the thermoplastic polymer particles.

19 Claims, 2 Drawing Sheets

(a)         (b)

(a)         (b)

(a)         (b)

PROCESS FOR THE MANUFACTURE OF THERMOPLASTIC POLYMER PARTICLES, THERMOPLASTIC POLYMER PARTICLES PREPARED THEREBY, AND ARTICLES PREPARED THEREFROM

CROSS-REFERENCE TO RELATED APPLICATIONS

This application is a National Stage application of PCT/US2018/046595, filed Aug. 14, 2018, which claims benefit of U.S. Provisional Application No. 62/549,568 filed on Aug. 24, 2017, both of which are incorporated by reference herein in their entirety.

BACKGROUND

High performance polymers, such as polyetherimide and polycarbonate, can be made into powders by emulsifying the polymer in an organic solvent, and further removing the organic solvent from the emulsion through distillation. Additional information relevant to such methods can be found, for example, in U.S. Pat. No. 6,528,611. However, particles made by such an emulsion distillation process can result in a poor yield of particles having the desired particle size characteristics. In addition, achieving particles having an average size of 20 to 100 micrometers remains a challenge using known techniques.

Therefore, there remains a need for an optimized process in order to obtain spherical polymer particles having desired size characteristics in a higher yield for commercial feasibility. Applications including additive manufacturing and powder coating can benefit from such a process.

BRIEF DESCRIPTION

A process for the manufacture of thermoplastic polymer particles comprises combining a first solution comprising a polyetherimide, a polycarbonate, or a combination thereof and an organic solvent with an aqueous solution comprising an effective amount of a surfactant to provide a mixture; agitating the mixture using a shear force generating device at a preselected peripheral rotational speed to provide an emulsion; heating the emulsion to a temperature of greater than 35° C., preferably greater than 50 to 99° C. to remove the organic solvent and provide an aqueous polymer dispersion comprising thermoplastic polymer particles; and recovering the thermoplastic polymer particles from the aqueous polymer dispersion in a yield of greater than 80%; wherein when the preselected peripheral rotational speed is 2 to less than 14 m/s, preferably 2 to 3.3 m/s, and the effective amount of the surfactant is 0.005 to 0.05 weight percent, based on the weight of the aqueous solution, the thermoplastic polymer particles are spherical particles having a Dv50 diameter of 35 to 80 micrometers; and a particle size distribution span of 1.0 to 1.5; when the preselected peripheral rotational speed is 14 to 23.5 m/s, preferably 14 to 19 m/s, and the effective amount of the surfactant is 0.005 to 0.05 weight percent, based on the weight of the aqueous solution, the thermoplastic polymer particles are spherical particles having a Dv50 diameter of 5 to 25 micrometers; and a particle size distribution span of 1.1 to 2.0; when the preselected peripheral rotational speed is 2 to less than 14 m/s, preferably 2 to 3.3 m/s, and the effective amount of the surfactant is greater than 0.05 to 1 weight percent, based on the weight of the aqueous solution, the thermoplastic polymer particles are spherical particles having a Dv50 diameter of 15 to 40 micrometers; and a particle size distribution span of 1.0 to 2.0; and when the preselected peripheral rotational speed is 14 to 23.5 m/s, preferably 14 to 19 m/s, and the effective amount of the surfactant is greater than 0.05 to 1 weight percent, based on the weight of the aqueous solution, the thermoplastic polymer particles are spherical particles having a Dv50 diameter of 1 to 20 micrometers; and a particle size distribution span of 1.1 to 2.0.

Thermoplastic polymer particles prepared according to the process are described.

An article prepared from the thermoplastic particles are also disclosed.

The above described and other features are exemplified by the following figures and detailed description.

BRIEF DESCRIPTION OF THE DRAWINGS

The following figures represent exemplary embodiments.

DETAILED DESCRIPTION

Figure 1:
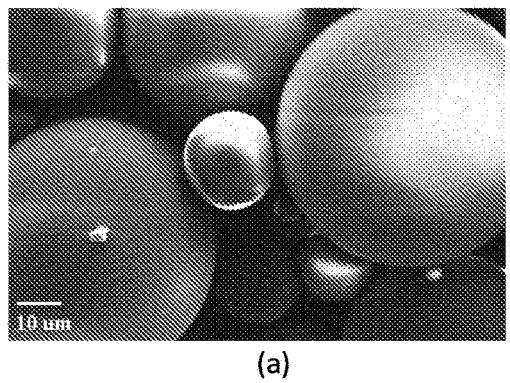
FIG. 1 shows (a) a scanning electron microscope (SEM) image of polycarbonate particles at 1000× magnification having a Dv50 of 46 micrometers (μm) (scale bar is 10 μm) and (b) a SEM images of polycarbonate particles at 1000× magnification having a Dv50 of 9.9 micrometers (scale bar is 10 μm).
Figure 1:
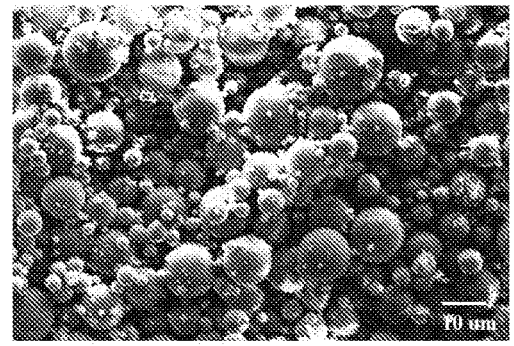

Disclosed herein is a process for the manufacture of thermoplastic polymer particles which relies on the formation of an aqueous polymer dispersion from an emulsion. Using the process described herein, polymer particles having a particular particle size and particle size distribution span can be obtained in high yield (e.g., greater than 80%). The present inventors have discovered that varying process parameters including surfactant concentration and homogenizer shear rate can significantly impact the resulting polymer particle size, particle size distribution span, and overall process yield. It was unexpectedly discovered that the particle size distribution can be controlled by controlling the shear rate where, contrary to expectations, higher shear led to wider population distribution of the micronized particles. Further, the present inventors have identified certain process parameters which can be optimized in order to prepare polymer particles having desired size characteristics in high yield.

Accordingly, an aspect of the present disclosure is a process for the manufacture of thermoplastic polymer particles. The disclosed process can advantageously provide the polymer particles in a yield of greater than 80%. The process includes combining a first solution comprising a polyetherimide, a polycarbonate, or a combination thereof and an organic solvent with an aqueous solution comprising an effective amount of surfactant to provide a mixture. The resulting mixture can be agitated using a shear force generating device operating at a preselected peripheral rotational speed to provide an emulsion.

The first solution can generally be prepared by dissolving a polyetherimide, a polycarbonate, or a combination thereof in an organic solvent to form the first solution.

Polyetherimides comprise more than 1, for example 10 to 1000, or 10 to 500, structural units of formula (1)

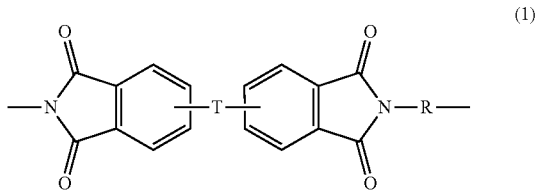

(1)

wherein each R is independently the same or different, and is a substituted or unsubstituted divalent organic group, such as a substituted or unsubstituted $C_{6-20}$ aromatic hydrocarbon group, a substituted or unsubstituted straight or branched chain $C_{2-20}$ alkylene group, a substituted or unsubstituted $C_{3-8}$ cycloalkylene group, or a halogenated derivative of any of the foregoing. In some embodiments, R is a divalent group of one or more of the following formulae (2)

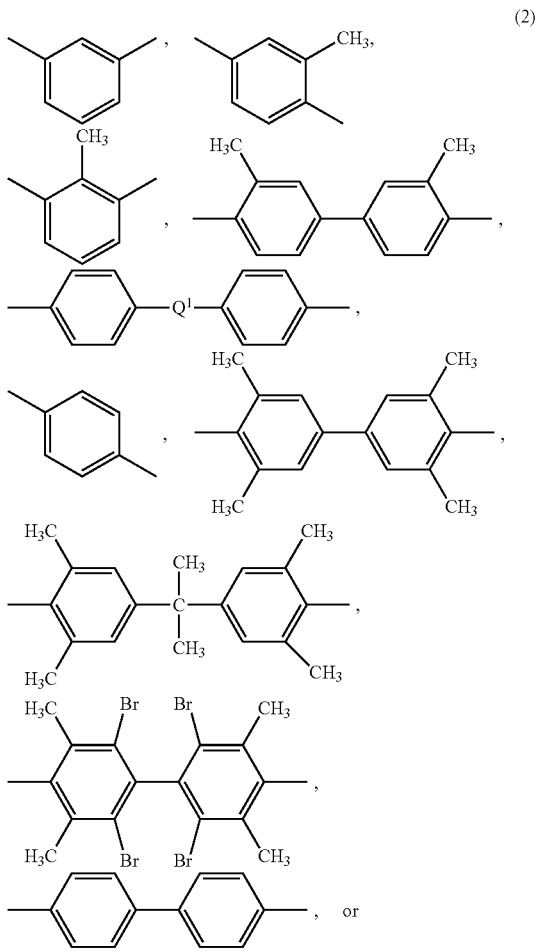

(2)

, or

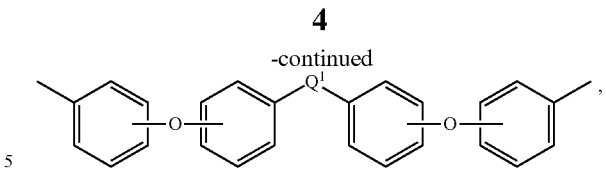

wherein $Q^1$ is —O—, —S—, —C(O)—, —SO$_2$—, —SO—, —P(R$^a$)(=O)— wherein R$^a$ is a $C_{1-8}$ alkyl or $C_{6-12}$ aryl, —C$_y$H$_{2y}$— wherein y is an integer from 1 to 5 or a halogenated derivative thereof (which includes perfluoroalkylene groups), or —(C$_6$H$_{10}$)$_z$— wherein z is an integer from 1 to 4. In some embodiments R is m-phenylene, p-phenylene, or a diarylene sulfone, in particular bis(4,4'-phenylene)sulfone, bis(3,4'-phenylene)sulfone, bis(3,3'-phenylene)sulfone, or a combination comprising at least one of the foregoing. In some embodiments, at least 10 mole percent or at least 50 mole percent of the R groups contain sulfone groups, and in other embodiments no R groups contain sulfone groups.

Further in formula (1), T is —O— or a group of the formula —O—Z—O— wherein the divalent bonds of the —O—Z— group are in the 3,3', 3,4', 4,3', or the 4,4' positions, and Z is an aromatic $C_{6-24}$ monocyclic or polycyclic moiety optionally substituted with 1 to 6 $C_{1-8}$ alkyl groups, 1 to 8 halogen atoms, or a combination comprising at least one of the foregoing, provided that the valence of Z is not exceeded. Examples of groups Z are groups of formula (3)

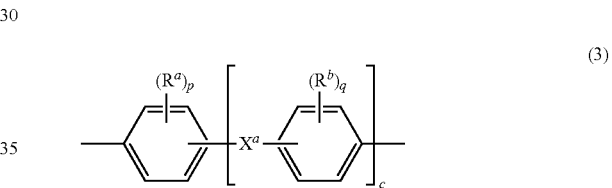

(3)

wherein $R^a$ and $R^b$ are each independently the same or different, and are a halogen atom or a monovalent $C_{1-6}$ alkyl group, for example; p and q are each independently integers of 0 to 4; c is 0 to 4; and $X^a$ is a bridging group connecting the hydroxy-substituted aromatic groups, where the bridging group and the hydroxy substituent of each $C_6$ arylene group are disposed ortho, meta, or para (specifically para) to each other on the $C_6$ arylene group. The bridging group $X^a$ can be a single bond, —O—, —S—, —S(O)—, —S(O)$_2$—, —C(O)—, or a $C_{1-18}$ organic bridging group. The $C_{1-18}$ organic bridging group can be cyclic or acyclic, aromatic or non-aromatic, and can further comprise heteroatoms such as halogens, oxygen, nitrogen, sulfur, silicon, or phosphorous. The $C_{1-18}$ organic group can be disposed such that the $C_6$ arylene groups connected thereto are each connected to a common alkylidene carbon or to different carbons of the $C_{1-18}$ organic bridging group. A specific example of a group Z is a divalent group of formula (3a)

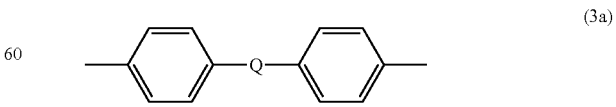

(3a)

wherein Q is —O—, —S—, —C(O)—, —SO$_2$—, —SO—, —P(R$^a$)(=O)— wherein R$^a$ is a $C_{1-8}$ alkyl or $C_{6-12}$ aryl, or —C$_y$H$_{2y}$— wherein y is an integer from 1 to 5 or a halogenated derivative thereof (including a perfluoroalkylene group). In a specific embodiment Z is a derived from bisphenol A, such that Q in formula (3a) is 2,2-isopropylidene.

In an embodiment in formula (1), R is m-phenylene, p-phenylene, or a combination comprising at least one of the foregoing, and T is —O—Z—O— wherein Z is a divalent group of formula (3a). Alternatively, R is m-phenylene, p-phenylene, or a combination comprising at least one of the foregoing, and T is —O—Z—O— wherein Z is a divalent group of formula (3a) and Q is 2,2-isopropylidene. Alternatively, the polyetherimide can be a copolymer optionally comprising additional structural polyetherimide units of formula (1) wherein at least 50 mole percent (mol %) of the R groups are bis(4,4'-phenylene)sulfone, bis(3,4'-phenylene)sulfone, bis(3,3'-phenylene)sulfone, or a combination comprising at least one of the foregoing and the remaining R groups are p-phenylene, m-phenylene, or a combination comprising at least one of the foregoing; and Z is 2,2-(4-phenylene)isopropylidene, i.e., a bisphenol A moiety.

In some embodiments, the polyetherimide is a copolymer that optionally comprises additional structural imide units that are not polyetherimide units, for example imide units of the formula

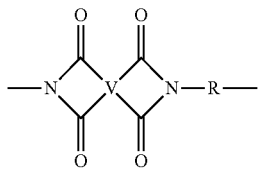

wherein R is as described in formula (1) and each V is the same or different, and is a substituted or unsubstituted $C_{6-20}$ aromatic hydrocarbon group, for example a tetravalent linker of the formulas

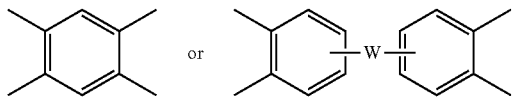

wherein W is a single bond, —O—, —S—, —C(O)—, —SO$_2$—, —SO—, —P(R$^a$)(=O)— wherein R$^a$ is a $C_{1-8}$ alkyl or $C_{6-12}$ aryl, or —C$_y$H$_{2y}$— wherein y is an integer from 1 to 5 or a halogenated derivative thereof (which includes perfluoroalkylene groups). These additional structural imide units preferably comprise less than 20 mol % of the total number of units, and more preferably can be present in amounts of 0 to 10 mol % of the total number of units, or 0 to 5 mol % of the total number of units, or 0 to 2 mole % of the total number of units. In some embodiments, no additional imide units are present in the polyetherimide.

The polyetherimide can be prepared by any of the methods well known to those skilled in the art, including the reaction of an aromatic bis(ether anhydride) of formula (5) or a chemical equivalent thereof, with an organic diamine of formula (6)

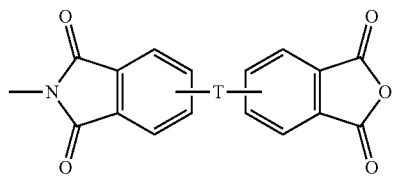

wherein T and R are defined as described above. Copolymers of the polyetherimides can be manufactured using a combination of an aromatic bis(ether anhydride) of formula (5) and an additional bis(anhydride) that is not a bis(ether anhydride), for example pyromellitic dianhydride or bis(3,4-dicarboxyphenyl) sulfone dianhydride.

Illustrative examples of aromatic bis(ether anhydride)s include 2,2-bis[4-(3,4-dicarboxyphenoxy)phenyl]propane dianhydride (also known as bisphenol A dianhydride or BPADA), 3,3-bis[4-(3,4-dicarboxyphenoxy)phenyl]propane dianhydride; 4,4'-bis(3,4-dicarboxyphenoxy)diphenyl ether dianhydride; 4,4'-bis(3,4-dicarboxyphenoxy)diphenyl sulfide dianhydride; 4,4'-bis(3,4-dicarboxyphenoxy)benzophenone dianhydride; 4,4'-bis(3,4-dicarboxyphenoxy)diphenyl sulfone dianhydride; 4,4'-bis(2,3-dicarboxyphenoxy)diphenyl ether dianhydride; 4,4'-bis(2,3-dicarboxyphenoxy)diphenyl sulfide dianhydride; 4,4'-bis(2,3-dicarboxyphenoxy) benzophenone dianhydride; 4,4'-bis(2,3-dicarboxyphenoxy) diphenyl sulfone dianhydride; 4-(2,3-dicarboxyphenoxy)-4'-(3,4-dicarboxyphenoxy)diphenyl-2,2-propane dianhydride; 4-(2,3-dicarboxyphenoxy)-4'-(3,4-dicarboxyphenoxy)diphenyl ether dianhydride; 4-(2,3-dicarboxyphenoxy)-4'-(3,4-dicarboxyphenoxy)diphenyl sulfide dianhydride; 4-(2,3-dicarboxyphenoxy)-4'-(3,4-dicarboxyphenoxy) benzophenone dianhydride; 4,4'-(hexafluoroisopropylidene) diphthalic anhydride; and 4-(2,3-dicarboxyphenoxy)-4'-(3,4-dicarboxyphenoxy)diphenyl sulfone dianhydride. A combination of different aromatic bis(ether anhydride)s can be used.

Examples of organic diamines include 1,4-butane diamine, 1,5-pentanediamine, 1,6-hexanediamine, 1,7-heptanediamine, 1,8-octanediamine, 1,9-nonanediamine, 1,10-decanediamine, 1,12-dodecanediamine, 1,18-octadecanediamine, 3-methylheptamethylenediamine, 4,4-dimethylheptamethylenediamine, 4-methylnonamethylenediamine, 5-methylnonamethylenediamine, 2,5-dimethylhexamethylenediamine, 2,5-dimethylheptamethylenediamine, 2,2-dimethylpropylenediamine, N-methyl-bis (3-aminopropyl) amine, 3-methoxyhexamethylenediamine, 1,2-bis(3-aminopropoxy) ethane, bis(3-aminopropyl) sulfide, 1,4-cyclohexanediamine, bis-(4-aminocyclohexyl) methane, m-phenylenediamine, p-phenylenediamine, 2,4-diaminotoluene, 2,6-diaminotoluene, m-xylylenediamine, p-xylylenediamine, 2-methyl-4,6-diethyl-1,3-phenylene-diamine, 5-methyl-4,6-diethyl-1,3-phenylene-diamine, benzidine, 3,3'-dimethylbenzidine, 3,3'-dimethoxybenzidine, 1,5-diaminonaphthalene, bis(4-aminophenyl) methane, bis(2-chloro-4-amino-3,5-diethylphenyl) methane, bis(4-aminophenyl) propane, 2,4-bis(p-amino-t-butyl) toluene, bis(p-amino-t-butylphenyl) ether, bis(p-methyl-o-aminophenyl) benzene, bis(p-methyl-o-aminopentyl) benzene, 1,3-diamino-4-isopropylbenzene, bis(4-aminophenyl) sulfide, bis-(4-aminophenyl) sulfone (also known as 4,4'-diaminodiphenyl sulfone (DDS)), and bis(4-aminophenyl) ether. Any regioisomer of the foregoing compounds can be used. $C_{1-4}$ alkylated or poly($C_{1-4}$)alkylated derivatives of any of the foregoing can be used, for example a polymethylated 1,6-hexanediamine. Combinations of these compounds can also be used. In some embodiments the organic diamine is m-phenylenediamine, p-phenylenediamine, 4,4'-diaminodiphenyl sulfone, 3,4'-diaminodiphenyl sulfone, 3,3'-diaminodiphenyl sulfone, or a combination comprising at least one of the foregoing.

The polyetherimides can have a melt index of 0.1 to 10 grams per minute (g/min), as measured by American Society for Testing Materials (ASTM) D1238 at 340 to 370° C., using a 6.6 kilogram (kg) weight. In some embodiments, the polyetherimide has a weight average molecular weight (Mw) of 1,000 to 150,000 grams/mole (Dalton), as measured by gel permeation chromatography, using polystyrene standards. In some embodiments the polyetherimide has an Mw of 10,000 to 80,000 Daltons. Such polyetherimides typically have an intrinsic viscosity greater than 0.2 deciliters per gram (dl/g), or, more specifically, 0.35 to 0.7 dl/g as measured in m-cresol at 25° C.

"Polycarbonate" as used herein means a polymer or copolymer having repeating structural carbonate units of formula (7)

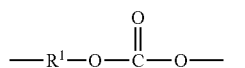

(7)

wherein at least 60 percent of the total number of $R^1$ groups are aromatic, or each $R^1$ contains at least one $C_{6-30}$ aromatic group. Specifically, each $R^1$ can be derived from a dihydroxy compound such as an aromatic dihydroxy compound of formula (8) or a bisphenol of formula (9).

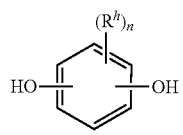

(8)

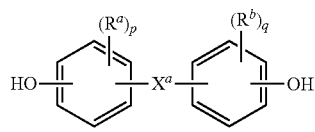

(9)

In formula (8), each $R^h$ is independently a halogen atom, for example bromine, a $C_{1-10}$ hydrocarbyl group such as a $C_{1-10}$ alkyl, a halogen-substituted $C_{1-10}$ alkyl, a $C_{6-10}$ aryl, or a halogen-substituted $C_{6-10}$ aryl, and n is 0 to 4.

In formula (9), $R^a$ and $R^b$ are each independently a halogen, $C_{1-12}$ alkoxy, or $C_{1-12}$ alkyl, and p and q are each independently integers of 0 to 4, such that when p or q is less than 4, the valence of each carbon of the ring is filled by hydrogen. In an embodiment, p and q is each 0, or p and q is each 1, and $R^a$ and $R^h$ are each a $C_{1-3}$ alkyl group, specifically methyl, disposed meta to the hydroxy group on each arylene group. $X^a$ is a bridging group connecting the two hydroxy-substituted aromatic groups, where the bridging group and the hydroxy substituent of each $C_6$ arylene group are disposed ortho, meta, or para (specifically para) to each other on the $C_6$ arylene group, for example, a single bond, —O—, —S—, —S(O)—, —S(O)$_2$—, —C(O)—, or a $C_{1-18}$ organic group, which can be cyclic or acyclic, aromatic or non-aromatic, and can further comprise heteroatoms such as halogens, oxygen, nitrogen, sulfur, silicon, or phosphorous. For example, $X^a$ can be a substituted or unsubstituted $C_{3-18}$ cycloalkylidene; a $C_{1-25}$ alkylidene of the formula —C($R^c$)($R^d$)— wherein $R^c$ and $R^d$ are each independently hydrogen, $C_{1-12}$ alkyl, $C_{1-12}$ cycloalkyl, $C_{7-12}$ arylalkyl, $C_{1-12}$ heteroalkyl, or cyclic $C_{7-12}$ heteroarylalkyl; or a group of the formula —C(=$R^e$)— wherein $R^e$ is a divalent $C_{1-12}$ hydrocarbon group.

In some embodiments, $X^a$ can be a substituted $C_{3-18}$ cycloalkylidene of formula (10)

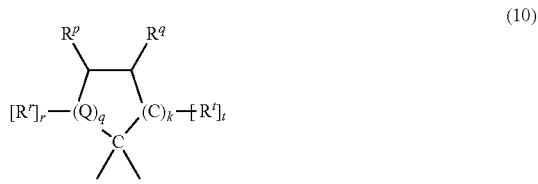

(10)

wherein $R^r$, $R^p$, $R^q$, and $R^t$ are each independently hydrogen, halogen, oxygen, or $C_{1-12}$ hydrocarbon groups; Q is a direct bond, a carbon, or a divalent oxygen, sulfur, or —N(Z)— where Z is hydrogen, halogen, hydroxy, $C_{1-12}$ alkyl, $C_{1-12}$ alkoxy, $C_{6-12}$ aryl, or $C_{1-12}$ acyl; r is 0 to 2, t is 1 or 2, q is 0 or 1, and k is 0 to 3, with the proviso that at least two of $R^r$, $R^p$, $R^q$, and $R^t$ taken together are a fused cycloaliphatic, aromatic, or heteroaromatic ring. It will be understood that where the fused ring is aromatic, the ring as shown in formula (10) will have an unsaturated carbon-carbon linkage where the ring is fused. When k is one and q is 0, the ring as shown in formula (10) contains 4 carbon atoms, when k is 2, the ring as shown in formula (10) contains 5 carbon atoms, and when k is 3, the ring contains 6 carbon atoms. In an embodiment, two adjacent groups (e.g., $R^q$ and $R^t$ taken together) form an aromatic group, and in another embodiment, $R^q$ and $R^t$ taken together form one aromatic group and $R^r$ and $R^p$ taken together form a second aromatic group. When $R^q$ and $R^t$ taken together form an aromatic group, $R^p$ can be a double-bonded oxygen atom, i.e., a ketone, or Q can be —N(Z)— wherein Z is phenyl.

Bisphenols wherein $X^a$ is a cycloalkylidene of formula (10) can be used in the manufacture of polycarbonates containing phthalimidine carbonate units of formula (11)

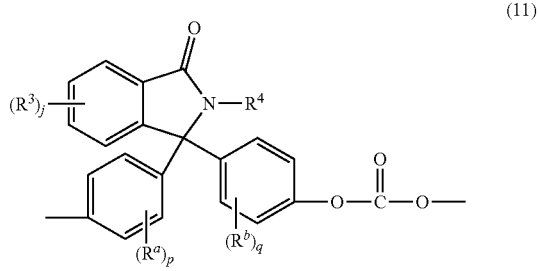

(11)

wherein $R^a$, $R^b$, p, and q are as in formula (9), $R^3$ is each independently a $C_{1-6}$ alkyl, j is 0 to 4, and $R_4$ is hydrogen, $C_{1-6}$ alkyl, or a substituted or unsubstituted phenyl, for example a phenyl substituted with up to five $C_{1-6}$ alkyls. For example, the phthalimidine carbonate units are of formula (12)

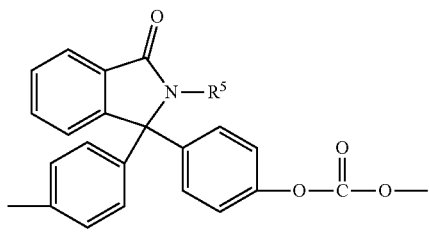

(12)

wherein $R^5$ is hydrogen, phenyl optionally substituted with up to five 5 $C_{1-6}$ alkyls, or $C_{1-4}$ alkyl. In an embodiment in formula (12), $R^5$ is hydrogen, methyl, or phenyl, specifically phenyl. Carbonate units (12) wherein $R^5$ is phenyl can be derived from 2-phenyl-3,3'-bis(4-hydroxy phenyl)phthalimidine (also known as 3,3-bis(4-hydroxyphenyl)-2-phenylisoindolin-1-one, or N-phenyl phenolphthalein bisphenol ("PPPBP")).

Some illustrative examples of dihydroxy compounds that can be used are described, for example, in WO 2013/175448 A1, US 2014/0295363, and WO 2014/072923. Specific dihydroxy compounds include resorcinol, 2,2-bis(4-hydroxyphenyl) propane ("bisphenol A" or "BPA"), 3,3-bis(4-hydroxyphenyl) phthalimidine, 2-phenyl-3,3'-bis(4-hydroxyphenyl) phthalimidine (also known as N-phenyl phenolphthalein bisphenol, "PPPBP", or 3,3-bis(4-hydroxyphenyl)-2-phenylisoindolin-1-one), 1,1-bis(4-hydroxy-3-methylphenyl)cyclohexane, and 1,1-bis(4-hydroxy-3-methylphenyl)-3,3,5-trimethylcyclohexane (isophorone bisphenol).

In a specific embodiment, the polycarbonate is a linear homopolymer containing bisphenol A carbonate units (BPA-PC), commercially available under the trade name LEXAN from SABIC; or a branched, cyanophenol end-capped bisphenol A homopolycarbonate produced via interfacial polymerization, containing 3 mol % 1,1,1-tris(4-hydroxyphenyl)ethane (THPE) branching agent, commercially available under the trade name LEXAN CFR from SABIC. A combination of a linear polycarbonate and a branched polycarbonate can be used. It is also possible to use a polycarbonate copolymer or interpolymer rather than a homopolymer. Polycarbonate copolymers can include copolycarbonates comprising two or more different types of carbonate units, for example units derived from BPA and PPPBP (commercially available under the trade name LEXAN XHT from SABIC); BPA and DMBPC (commercially available under the trade name DMX from SABIC); or BPA and isophorone bisphenol (commercially available under the trade name APEC from Bayer).

Generally, organic solvents suitable for use with the process disclosed herein have the combination of the following features. The thermoplastic polymer (e.g., polyetherimide or polycarbonate) is soluble in the organic solvent, the solvent has a boiling point that is less than 100° C., and the organic solvent is substantially immiscible with water. "Substantially immiscible with water" as used herein means that the organic solvent is soluble to an extent of less than 10% by weight, or less than 5% by weight, or less than 1% by weight in water, or that water is soluble to the extent of less than 10%, or less than 5%, or less than 1% by weight in the organic solvent. In some embodiments, the organic solvent is immiscible with water. The organic solvent can include combinations comprising at least two organic solvents. The organic solvent can comprise methylene chloride, chloroform, dichloroethane, or a combination comprising at least one of the foregoing. In some embodiments, the organic solvent is methylene chloride The first solution can include the polyetherimide, the polycarbonate, or the combination thereof in an amount of 3 to 30 weight percent (wt %), or 10 to 30 wt %, or 15 to 25 wt %, or 20 to 25 wt %, each based on the total weight of the first solution.

The aqueous solution generally comprises water, preferably deionized water. In some embodiments, the aqueous solution comprises an aqueous buffered solution. The aqueous solution can have a pH of 1 to 12, preferably 4 to 8. The water can be maintained at a temperature of 5 to 70° C., or 10 to 60° C., or 15 to 60° C., or 20 to 60° C., or 25 to 60° C.

The aqueous solution further comprises a surfactant. The surfactant can be anionic, cationic, amphoteric, or nonionic. Preferably the surfactant is anionic. Among the anionic surfactants that can be used are the alkali metal, alkaline earth metal, ammonium and anise salts, of organic sulfuric reaction products having in their molecular structure a $C_{8-36}$, or $C_{8-22}$, alkyl group and a sulfonic acid or sulfuric acid ester group. Included in the term alkyl is the alkyl portion of acyl radicals. Examples include the sodium, ammonium, potassium or magnesium alkyl sulfates, especially those obtained by sulfating the higher alcohols ($C_{8-18}$ carbon atoms) sodium or magnesium alkyl benzene or alkyl toluene sulfonates, in which the alkyl group contains from about 9 to about 15 carbon atoms, the alkyl radical being either a straight or branched aliphatic chain; sodium or magnesium paraffin sulfonates and olefin sulfonates in which the alkyl or alkenyl group contains 10 to 20 carbon atoms; sodium $C_{10-20}$ alkyl glyceryl ether sulfonates, especially those ethers of alcohols derived from tallow and coconut oil; sodium coconut oil fatty acid monoglyceride sulfates and sulfonates; sodium, ammonium or magnesium salts of ($C_{8-12}$ alkyl) phenol ethylene oxide ether sulfates with about 1 to about 30 units of ethylene oxide per molecule; the reaction products of fatty acids esterified with isethionic acid and neutralized with sodium hydroxide where, for example, the fatty acids are derived from coconut oil; sodium or potassium salts of fatty acid amides of a methyl tauride in which the fatty acids, for example, are derived from coconut oil and sodium or potassium beta-acetoxy or beta-acetamido-alkanesulfonates where the alkane has from 8 to 22 carbon atoms.

Among the specific anionic surfactants that can be used are $C_{8-22}$ alkyl sulfates (e.g., ammonium lauryl sulfate, sodium lauryl sulfate, sodium lauryl ether sulfate (SLES), sodium myreth sulfate, and dioctyl sodium sulfosuccinate), $C_{8-36}$ alkyl sulfonates comprising an organic sulfonate anion (e.g., octyl sulfonate, lauryl sulfonate, myristyl sulfonate, hexadecyl sulfonate, 2-ethylhexyl sulfonate, docosyl sulfonate, tetracosyl sulfonate, p-tosylate, butylphenyl sulfonate, dodecylphenyl sulfonate, octadecylphenyl sulfonate, and dibutylphenyl, sulfonate, diisopropyl naphthyl sulfonate, and dibutylnaphthyl sulfonate) and a cation (e.g., phosphonium or ammonium), $C_{8-36}$ perfluoroalkylsulfonates (e.g., perfluorooctanesulfonate (PFOS), perfluorobutanesulfonate), and linear $C_{7-36}$ alkylbenzene sulfonates (LABS) (e.g., sodium dodecylbenzenesulfonate). Alkyl ether sulfates having the formula $RO(C_2H_4O)_xSO_3M$ wherein R is a $C_{8-36}$ alkyl or alkenyl, x is 1 to 30, and M is a water-soluble cation. The alkyl ether sulfates are condensation products of ethylene oxide and monohydric alcohols having from about 10 to about 20 carbon atoms. Preferably, R has 10 to 16 carbon atoms. The alcohols can be derived from natural fats, e.g., coconut oil or tallow, or can be synthetic. Such alcohols are reacted with 1 to 30, and especially 1 to 12, molar proportions of ethylene oxide and the resulting mixture of molecular species is sulfated and neutralized. In some embodiments, the surfactant comprises a ($C_{8-36}$alkyl)benzene sulfonate, ($C_{8-36}$alkyl) sulfonate, mono- or di($C_{8-36}$alkyl) sulfosuccinate, ($C_{8-36}$alkyl ether) sulfate, ($C_{8-36}$)alkyl ether sulfonate, perfluoro($C_{2-12}$alkyl) sulfate, or perfluoro($C_{2-12}$carboxylate), preferably sodium dodecyl sulfate, sodium lauryl sulfate, sodium laureth sulfate, sodium dioctyl sulfosuccinate, sodium dihexyl sulfosuccinate, perfluorooctane sulfonate, perfluorooctanoic acid, or sodium dodecylbenzenesulfonate, more preferably wherein the anionic surfactant is sodium dodecylbenzenesulfonate.

Nonionic surfactants can also be used and can include a $C_{8-22}$ aliphatic alcohol ethoxylate having about 1 to about 25 moles of ethylene oxide and having have a narrow homolog distribution of the ethylene oxide ("narrow range ethoxylates") or a broad homolog distribution of the ethylene oxide ("broad range ethoxylates"); and preferably $C_{10-20}$ aliphatic alcohol ethoxylates having about 2 to about 18 moles of ethylene oxide. Examples of commercially available nonionic surfactants of this type are Tergitol 15-S-9 (a condensation product of $C_{11-15}$ linear secondary alcohol with 9 moles ethylene oxide), Tergitol 24-L-NMW (a condensation product of $C_{12-14}$ linear primary alcohol with 6 moles of ethylene oxide) with a narrow molecular weight distribution from Dow Chemical Company. This class of product also includes the Genapol brands of Clariant GmbH.

Other nonionic surfactants that can be used include polyethylene, polypropylene, and polybutylene oxide condensates of $C_{6-12}$ alkyl phenols, for example compounds having 4 to 25 moles of ethylene oxide per mole of $C_{6-12}$ alkylphenol, preferably 5 to 18 moles of ethylene oxide per mole of $C_{6-12}$ alkylphenol. Commercially available surfactants of this type include Igepal CO-630, Triton X-45, X-114, X-100 and X102, Tergitol TMN-10, Tergitol TMN-100X, and Tergitol TMN-6 (all polyethoxylated 2,6,8-trimethyl-nonylphenols or mixtures thereof) from Dow Chemical Corporation, and the Arkopal-N products from Hoechst AG.

Still others include the addition products of ethylene oxide with a hydrophobic base formed by the condensation of propylene oxide with propylene glycol. The hydrophobic portion of these compounds preferably has a molecular weight between about 1500 and about 1800 Daltons. Commercially available examples of this class of product are the Pluronic brands from BASF and the Genapol PF trademarks of Hoechst AG.

The addition products of ethylene oxide with a reaction product of propylene oxide and ethylenediamine can also be used. The hydrophobic moiety of these compounds consists of the reaction product of ethylenediamine and excess propylene oxide, and generally has a molecular weight of about 2500 to about 3000 Daltons (Da). This hydrophobic moiety of ethylene oxide is added until the product contains from about 40 to about 80 wt % of polyoxyethylene and has a molecular weight of about 5000 to about 11,000 Da. Commercially available examples of this compound class are the Tetronic brands from BASF and the Genapol PN trademarks of Hoechst AG.

In some embodiments, the nonionic surfactant is a $C_{6-12}$ alkyl phenol having 4 to 25 moles of ethylene oxide per mole of $C_{6-12}$ alkylphenol, preferably 5 to 18 moles of ethylene oxide per mole of $C_{6-12}$ alkylphenol.

In some embodiments, the surfactant comprises a biopolymer, for example gelatin, carrageenan, pectin, soy protein, lecithin, casein, collagen, albumin, gum arabic, agar, protein, cellulose and derivatives thereof, a polysaccharide and derivatives thereof, starch and derivatives thereof, or the like, or a combination comprising at least one of the foregoing, preferably gelatin. Gelatin is a product obtained by the partial hydrolysis of collagen derived from the skin, white connective tissue, and bones of animals. It is a derived protein comprising various amino acids linked between adjacent imino and carbonyl groups to provide a peptide bond. The amino acid combinations in gelatin provide amphoteric properties, which are responsible for varying isoelectric values, depending somewhat upon the methods of processing. Important physical properties of gelatin such as solubility, swelling, and viscosity show minimum values at the isoelectric point. In some embodiments, the gelatin can be a recombinant gelatin or a plant-based gelatin.

The gelatin surfactant can comprise type a gelatin, type B gelatin, or a combination comprising at least one of the foregoing. Type A gelatin results from acid pretreatment (swelling of the raw material in the presence of acid) and is generally made from frozen pork skins treated in dilute acid (HCl, $H_2SO_3$, $H_3PO_4$, or $H_2SO_4$) at a pH of 1 to 2 for 10 to 30 hours, after which it is water washed to remove excess acid, followed by extraction and drying in the conventional manner. Type B gelatin results from alkali pretreatment (swelling of the raw material in the presence of an alkali) and is generally made from ossein or hide stock which is treated in saturated lime water for 3 to 12 weeks, after which the lime is washed out and neutralized with acid. The adjusted stock is then hot water extracted and dried as with type A. Dry bone is cleaned, crushed, and treated for 10 to 14 days with 4 to 7% HCl to remove the minerals (principally tricalcium phosphate) and other impurities before reaching the stage known as ossein. Dry bone is 13 to 17% gelatin whereas dry ossein is 63 to 70% gelatin. Type A gelatin is characterized by an isoelectric zone between pH 7 and 9, whereas type B gelatin has an isoelectric zone between pH 4.7 and 5.0. Thus the ionic character of the gelatin when used as a surfactant can be selected based on the pH of the second solution. Relative to each other, type A gelatin has less color, better clarity, more brittleness in film form and is faster drying than type B. In some embodiments, the gelatin is type B gelatin.

Combinations comprising at least one of the foregoing surfactants can also be used.

The surfactant is present in the aqueous solution in an effective amount. For example, the surfactant can be present in an amount of 0.005 to 1 wt %, based on the weight of the aqueous solution. In some embodiments, the surfactant is present in an amount of 0.005 to 0.05 wt %, based on the weight of the aqueous solution. In some embodiments, the surfactant is present in an amount of 0.05 to 1 wt %, based on the weight of the aqueous solution. The amount of surfactant present in the aqueous solution can affect the average size and size distribution span of the resulting polymer particles as will be further discussed below, and as further illustrated by the working examples below.

The first solution and the aqueous solution are combined to provide a mixture. The method further comprises agitating the mixture using a shear force generating device operating at a preselected peripheral rotational speed to provide an emulsion. Peripheral rotational speed can also be referred to as the homogenizer tip speed or tangential speed. Peripheral rotational speed can be determined based on the rotational speed of the homogenizer (e.g., revolutions per minute) and the diameter of the homogenizer tip. The tangential speed is proportional to the rotational speed. The peripheral rotational speed can be 2 to 24 meters per second (m/s), and can be selected in order to provide polymer particles having the desired size characteristics. In some embodiments, the peripheral rotational speed can be 2 to less than 14 m/s, or 2 to 3.3 m/s. In some embodiments, the peripheral rotational speed can be 14 to 23.5 m/s, or 14 to 19 m/s.

Additional characterization can be done by quantifying the shear rate experienced by the multi-phase system in the shear generating regime of the device. Thus, the agitating can further be conducted at a particular shear rate generated by the gap width between the stationary and rotating parts of the device. In some embodiments, the agitating can be accomplished using a shear rate of 4,000 to 30,000 $s^{-1}$, or 5,000 to 20,000 $s^{-1}$, or 5,000 to 10,000 $s^{-1}$. For example, in some embodiments, the agitating can be at a shear rate of 4,000 to less than 28,000 $s^{-1}$, or 4,000 to 6,650 $s^1$. In some embodiments, the agitating can be at a shear rate of 28,000 to 47,000 $s^{-1}$, or 28,000 to 38,000 $s^{-1}$.

In some embodiments, the agitating can be using a shear force generating device operating at a rotational speed and time sufficient to provide an energy per volume input of 1 to 200 $J/cm^3$, or 1 to 175 $J/cm^3$, or 1 to 155 $J/cm^3$, or 1 to 100 $J/cm^3$, or 1 to 50 $J/cm^3$, or 1 to 25 $J/cm^3$.

Agitating the emulsion can be for a time of 0.5 to 30 minutes, or 1 to 25 minutes, or 5 to 25 minutes, or 10 to 20 minutes, or 5 minutes to 24 hours, or 30 minutes to 24 hours, or 1 to 24 hours, or 3 to 10 hours. The time needed for agitating the emulsion can be selected based, for example, on the scale of the emulsion and the time needed to sufficiently mix the emulsion, which can be determined by the skilled person based on the information provided herein. Such time can also be determined as a function of shear energy input per unit volume of emulsion that would be needed for achieving a desired extent of emulsification.

The resulting emulsion comprises water in a water:organic solvent weight ratio of greater than or equal to 0.2, preferably 0.4 to 3, more preferably 0.5 to 1.5, even more preferably 0.6 to 1.25.

After formation of the emulsion, the emulsion can be heated to a temperature of greater than 35° C., or greater than 40° C., or greater than 40 to 99° C. or greater than 50 to 99° C., or greater than 50 to 90° C., or greater than 50 to 85° C. to remove substantially all of the organic solvent. Removal of the organic solvent affords an aqueous polymer dispersion comprising thermoplastic polymer particles, in particular, wherein the thermoplastic particles comprise polyetherimide, polycarbonate, or a combination thereof.

Heating the emulsion can comprise transferring the emulsion into a receiving water at a temperature of greater than 35° C., or greater than 50 to 99° C. to remove the organic solvent. The receiving water can be deionized water, an aqueous buffered solution, or water having a pH of 1 to 12. In some embodiments, the receiving water optionally comprises a surfactant. The surfactant present in the receiving water can be the same or different as the surfactant of the second solution. In some embodiments, the surfactant present in the receiving water can be sodium dodecyl benzene sulfonate, sodium lauryl sulfate, or a combination comprising at least one of the foregoing, preferably sodium dodecyl benzene sulfonate. When present, the surfactant in the receiving water can be in an amount of 0.01 to 3 wt %, or 0.01 to 1 wt %, or 0.1 to 0.5 wt % based on the total weight of the receiving water. In some embodiments, the emulsion can be transferred to the receiving water in a dropwise manner. In some embodiments, the emulsion can be transferred to the receiving water by spraying through a nozzle. In some embodiments, the emulsion can be heated up to, below, or above the boiling point of the emulsion prior to transferring to the receiving water. After transferring the emulsion to the receiving water, the organic solvent can be removed (e.g., by distillation) to form an aqueous polymer dispersion.

Heating the emulsion can alternatively comprise heating the emulsion to a temperature of greater than 35° C., or greater than 50 to 99° C., or greater than 50 to 80° C., or greater than 50 to 70° C. by direct heating to remove the organic solvent. "Direct heating" can include, for example, immersing the container comprising the emulsion in a heated oil bath. Heating the emulsion is preferably under atmospheric pressure. A variation in atmospheric pressure away from the standard 1 atm pressure can result in a corresponding increase or decrease in the operating temperature needed for heating the emulsion to effect solvent removal by evaporation.

The process further comprises recovering the polymer particles from the aqueous polymer dispersion, wherein the particles are recovered in a yield of greater than 80%. Recovering can be by any liquid-solid separation technique that is generally known, including decanting, centrifuging, filtering, using a hydrocyclone separator, or a combination comprising at least one of the foregoing. For example, recovering can be by filtering the dispersion. Filtering can include one or more steps, each step independently using a filter having a desired pore size. For example, recovering the particles can include filtering the dispersion through a filter having an average pore size of 150 µm to remove large particles (e.g., particles having a diameter greater than 150 µm). The filtrate, including particles having a diameter of less than 150 µm, can subsequently be filtered, for example using a filter having an average pore size of 1 µm to provide a wet cake comprising the thermoplastic polymer particles. In some embodiments, the wet cake can be washed one or more times with water, for example the wet cake can be washed with deionized water at a temperature of 25 to 100° C. The wet particles can be washed until a desired level of residual surfactant is reached. For example, the wet particles can be washed with deionized water until the amount of residual surfactant is less than 1000 ppm, or 1 ppb to 1000 ppm, or 1 ppb to 500 ppm, or 1 ppb to 100 ppm, or 1 ppb to 1 ppm. In some embodiments, the wet cake can be dried, for example by heating, under vacuum, or a combination comprising at least one of the foregoing.

The particles recovered from the dispersion can be of a particular particle size and size distribution span, which can depend on the process parameters used to prepare the dispersion, in particular, the homogenizer tip speed and the amount of surfactant. The particle sizes provided herein are volume-based particle sizes. "Dv50" corresponds to 50% of the particles (based on volume) below a certain diameter. Similarly, "Dv10" corresponds to 10% of the particles (based on volume) being below a certain diameter, and "Dv90" corresponds to 90% of the particles (based on volume) being below a certain diameter. Particle size and size distribution can be measured according to techniques that are generally known, including, for example, laser diffraction. Particle size can be characterized using the aqueous dispersion described above. Alternatively, isolated and dried particles can be redispersed in water prior to conducting the measurement.

For example, when the peripheral rotational speed is 2 to less than 14 m/s, or 2 to 3.3 m/s, and the effective amount of surfactant is 0.005 to 0.05 wt %, based on the weight of the aqueous solution, the thermoplastic polymer particles are spherical particles having a Dv50 diameter of 35 to 80 μm and a particle size distribution span of 1.0 to 1.5.

When the peripheral rotational speed is 14 to 23.5 m/s, or 14 to 19 m/s, and the effective amount of surfactant is 0.005 to 0.05 wt %, based on the weight of the aqueous solution, the thermoplastic polymer particles are spherical particles having a Dv50 diameter of 5 to 25 μm and a particle size distribution span of 1.1 to 2.0.

When the peripheral rotational speed is 2 to less than 14 m/s, or 2 to 3.3 m/s, and the effective amount of surfactant is greater than 0.05 to 1 wt %, based on the weight of the aqueous solution, the thermoplastic polymer particles are spherical particles having a Dv50 diameter of 15 to 40 μm and a particle size distribution span of 1.0 to 2.0.

When the peripheral rotational speed is 14 to 23.5 m/s, or 14 to 19 m/s, and the effective amount of surfactant is greater than 0.05 to wt %, based on the weight of the aqueous solution, the thermoplastic polymer particles are spherical particles having a Dv50 diameter of 1 to 20 μm and a particle size distribution span of 1.1 to 2.0.

In a specific embodiment, the preselected peripheral rotational speed is 2 to 3.3 m/s, and the effective amount of the surfactant is 0.005 to 0.05 wt %, based on the weight of the aqueous solution, and the thermoplastic polymer particles are spherical particles having a Dv10 diameter of 15 to 45 μm, a Dv50 diameter of 35 to 80 μm, a Dv90 diameter of 65 to 130 μm, and a particle size distribution span of 1.0 to 1.8.

In another specific embodiment, the preselected peripheral rotational speed is 14 to 19 m/s, and the effective amount of the surfactant is 0.005 to 0.05 wt %, based on the weight of the aqueous solution, and the thermoplastic polymer particles are spherical particles having a Dv10 diameter of 1 to 10 μm, a Dv50 diameter of 3 to 30 μm, a Dv90 diameter of 5 to 50 μm, and a particle size distribution span of 1.1 to 2.8.

In another specific embodiment, the preselected peripheral rotational speed is 2 to 3.3 m/s, and the effective amount of the surfactant is 0.05 to 1 wt %, based on the weight of the aqueous solution, and the thermoplastic polymer particles are spherical particles having a Dv10 diameter of 5 to 25 μm, a Dv50 diameter of 15 to 40 μm, a Dv90 diameter of 30 to 80 μm, and a particle size distribution span of 1.1 to 2.4.

In yet another specific embodiment, the preselected peripheral rotational speed is 14 to 19 m/s, and the effective amount of the surfactant is 0.05 to 1 wt %, based on the weight of the aqueous solution, and the thermoplastic polymer particles are spherical particles having a Dv10 diameter of 1 to 5 μm, a Dv50 diameter of 2 to 20 μm, a Dv90 diameter of 4 to 30 μm, and a particle size distribution span of 1.2 to 2.5.

The process for the manufacture of the thermoplastic polymer particles can provide spherical particles, for example particles having a sphericity of greater than 0.7, preferably greater than 0.8, more preferably 0.9, even more preferably greater than 0.95. For example, the sphericity can be 0.7 to 1, or 0.8 to 1, or 0.9 to 1, or 0.95 to 1. The sphericity is defined by $((6*V_p)/(D_p*A_p))$, where $V_p$ is the volume of the particle, $D_p$ is the diameter of the particle and $A_p$ is the surface area of the particle.

In some embodiments, first solution comprising the thermoplastic polymer and the organic solvent can optionally further comprise one or more additives known in the art, with the proviso that the additive(s) are selected so as to not significantly adversely affect the desired properties of the resulting thermoplastic polymer particles. Such additives include a particulate inorganic filler (such as glass, ceramic, or metal, e.g., ceramic particles), a particulate organic filler (such as carbon or a crosslinked polymer), conductive filler (such as graphite or single-walled or multi-walled carbon nanotubes), an inorganic filler, organic fiber, inorganic fiber, conductive ink, antioxidant, heat stabilizer, light stabilizer, ultraviolet (UV) light stabilizer, UV absorbing additive, NIR absorbing additive, IR absorbing additive, laser marking dye, plasticizer, lubricant, release agent (such as a mold release agent), antistatic agent, anti-fog agent, antimicrobial agent, colorant (e.g, a dye or pigment), surface effect additive, radiation stabilizer, flame retardant, anti-drip agent (e.g., a PTFE-encapsulated styrene-acrylonitrile copolymer (TSAN)), a fragrance, or a combination comprising at least one of the foregoing. In general, the additives are used in the amounts known to be effective. For example, the total amount of the additive composition (other than any filler) can be 0.001 to 10.0 wt %, or 0.01 to 5 wt %, each based on the total weight of the first solution.

For example, a combination of a heat stabilizer, mold release agent, and ultraviolet light stabilizer can be used. Pigments, surface effect agents, and nanosized fillers are also specifically contemplated, as such materials can be readily co-dispersed with the polymers, or pre-combined with the polymers. In some embodiments, the first solution preferably comprises a dye or a pigment, for example a near infrared (NIR) dye in an amount of 0.001 to 10 wt %, or 0.01 to 10 wt %, or 0.01 to 1 wt %, based on the total weight of the first solution.

Advantageously, the one or more additives incorporated into the first solution can be incorporated into the resulting thermoplastic polymer particles. For example, the thermoplastic polymer particles can comprise an additive in an amount of 0.001 to 10.0 wt %, or 0.01 to 5 wt %, based on the weight of the thermoplastic polymer particles. In an embodiment, the thermoplastic polymer particles can comprise a dye or pigment in an amount of 0.001 to 10.0 wt %, or 0.01 to 5 wt %, based on the weight of the thermoplastic polymer particles.

Thermoplastic polymer particles prepared according to the above-described process are another aspect of the present disclosure. The particles can comprise polyetherimide, polycarbonate, or a combination thereof, and can have the particle size and size distribution spans as set forth above.

The thermoplastic polymer particles prepared according to the method disclosed herein can be used in many applications where particulate, high performance polymers are used, for example in coating applications, composites, as additives and fillers in composites, and in additive manufacturing. Therefore an article prepared from the thermoplastic polymer particles represents another aspect of the present disclosure. Advantageously, the thermoplastic polymer particles described herein can be used for the manufacture of articles including molded articles, extruded articles, powder bed fused articles, coatings (e.g., protective coatings, powder coatings), coated articles, films, thermoplastic composite articles, thermoset composite articles, sintered articles, and the like.

Using a specific combination of optimized process parameters, thermoplastic polymer particles having particular size characteristics can be obtained in high yields. Accordingly, an improved process for the preparation of thermoplastic polymer particles is provided.

This disclosure is further illustrated by the following examples, which are non-limiting.

EXAMPLES

Materials for the following examples are listed in Table 1.

TABLE 1

| Abbreviation | Chemical Description | Source |
|---|---|---|
| PEI | Polyetherimide made from the reaction of bisphenol A dianhydride with meta-phenylene diamine, having a glass transition temperature of 217° C., available as ULTEM 1010. | SABIC |
| PC-1 | High heat copolycarbonate comprising 67 mole percent bisphenol A carbonate units and 33 mole percent 2-phenyl-3,3'-bis(4-hydroxyphenyl) phthalimidine carbonate units and having a weight average molecular weight of 23,000 grams per mole and a glass transition temperature of 198° C., available as LEXAN XHT. | SABIC |
| PC-2 | Crosslinkable copolycarbonate containing 10 mole percent repeat units derived from 4,4'-dihydroxybenzophenone and 90 mole percent repeat units derived from bisphenol-A, end-capped with p-cumyl phenol, prepared according to the procedure described in U.S. 9110370. | SABIC |
| SDBS | Sodium dodecylbenzenesulfonate, CAS Reg. No. 25155-30-0 | Sigma Aldrich |
| Antifoam Agent-1 | Antifoam agent, available as M045 Antifoam Agent | Brenntag Southwest, Inc. |
| Antifoam Agent-2 | Antifoam agent, available as NALCO 7465 | Nalco Ltd. |
| DCM | Dichloromethane | Fisher Scientific |
| DIW | Deionized Water | SABIC |

Emulsion Preparation

In general, emulsions were prepared by dissolving the desired thermoplastic polymer (i.e., PEI or PC) in an organic solvent (e.g., methylene chloride) using a shaker table to provide a polymer solution with no visibly suspended particles. An ionic surfactant was dissolved in water at a desired concentration and the aqueous solution was then added to the polymer solution. The amount of the aqueous solution added to the organic solution was determined according to the desired weight ratio of the two phases:

Phase ratio in emulsion=(Weight of aqueous phase)/(Weight of organic phase)

The resulting mixture was emulsified using a two-step process. First, the thorough mixing of the two solutions was done using a low shear device to provide a preliminary emulsion. Second, the preliminary emulsion was subjected to a high degree of shear force using an IKA high shear mixer (IKA T25 ULTRA Turrax with S25N-25F tool). The rotational speed of the high shear mixing device and the homogenization time was varied, producing stable emulsions. The rotor and stator diameters were 18 millimeters and 25 millimeters, respectively. The gap between the rotor and the stator was 0.5 millimeters. The minimum and maximum rotational speeds employed were 2,800 and 25,000 revolutions per minutes, respectively.

Preparation of Aqueous Dispersion

Polymer particles were precipitated from the emulsion was accomplished by precipitation of emulsion with hot water ("Method A") or by direct volatilization of the organic solvent from the emulsion ("Method B").

Method A: 100 grams of the emulsion was transferred dropwise to a receiving vessel containing 600 grams of deionized water and 1 gram of SDBS surfactant. The receiving vessel was maintained at a predetermined temperature and agitated at a set speed (rpm). After complete transfer, the receiving vessel was maintained at a temperature of 50 to 95° C. for ten minutes to remove residual organic solvent. The aqueous dispersion thus obtained was passed through a 150 micrometer sieve. The aqueous dispersion which passed through the sieve was then filtered under vacuum using a microfiber filter paper having a 0.7 micrometer pore size. The particles were washed well with deionized water (up to 300 milliliters), isolated, and dried in a vacuum oven at a temperature of 30 to 105° C. overnight. Based on the polymer present in 100 grams of emulsion, the process yield for particles having a size below 150 micrometers was calculated according to the following equation:

Process Yield=(1−(Weight of polymer powder>150 micrometers)/(Weight of polymer present in the emulsion))×100

In specific examples that follow, a pre-determined amount of anti-foaming agent in amounts ranging of 25 to 1000 ppm was used. Use of anti-foaming agents can control the foaming caused by presence of surfactant, mixing, and methylene chloride vapor formation. The agitators used for the following examples included a wide range of agitator designs which are capable of moving the liquid emulsion phase as well as maintaining solid particle suspension in the slurry which is formed during emulsion precipitation. To control the foam build-up on top of the hot water surface as well as to constantly sweep off the methylene chloride vapor from the headspace, one or more nitrogen sweeps were also employed in some instances. However, the system may also be operated without a nitrogen sweep.

Method B: The emulsion was added to a four-liter beaker equipped with a stirrer. The beaker was placed in an oil bath equipped with an oil temperature readout and temperature control. Several different types of agitators were used. By heating in the oil bath, evaporation of methylene chloride from emulsion and precipitation of the polymer into the aqueous solution could be achieved. To control the foam build-up on top of the hot water surface as well as to constantly sweep off the methylene chloride vapor from the headspace, one or more nitrogen sweeps were employed. Specific angles of nitrogen sweeps were employed to minimize foam accumulation on top of the liquid surface. After a predetermined period of evaporation time, only polymer in the aqueous slurry remained in the beaker due to near-complete volatilization of the organic solvent from the emulsion. The aqueous dispersion obtained in this way was passed through a 150 micrometer sieve. The dispersion was then filtered under vacuum using a microfiber filter paper having 0.7 micrometer pore size. The top liquid was separated from the settled polymer particles. The polymer particles recovered were washed well with deionized water (up to 300 milliliters), isolated, and dried in vacuum oven at 50 to 105° C. overnight.

Polymer Particle Characterization

The particle size distribution was measured in water using laser diffraction technology on a Mastersizer 3000 from Malvern. The aqueous particle dispersion obtained after passing through the sieve in either Method A or Method B, described above, was used for particle size measurement. Specifically, the volume-based particle size distribution was then measured. "Dv50" corresponds to 50% of the particles (based on volume) below a certain diameter. Dv50 is considered the mean particle size for a volume distribution. "Dv90" and "Dv10" correspond to 90% and 10%, respectively, of the particles (based on volume) below a certain diameter. The particle size distribution, expressed as the "span" was calculated according to the following equation:

$$\text{Span} = (Dv90 - Dv10)/Dv50$$

A smaller span value indicates a narrower size distribution.

The particle analysis can also be done on the dried powders by first preparing a slurry in water containing at least 500 ppm of an anionic surfactant, and sonicating for five minutes prior to analysis.

The morphology of the dried powder samples was analyzed by scanning electron microscopy (SEM). The dried powder samples were coated with Pt/Pd and imaged using SEM in lens mode using a Zeiss Supra 40 VP SEM.

Examples 1-10

Examples 1-9 show polymer particles prepared from polycarbonate PC-2. As shown in Table 2 in Examples 1-6, the particle size distribution can be varied for a range of Dv50 values (from 5.6 to 21.7) by controlling the speed of the homogenization tool. This was accomplished by determining conditions for homogenizer agitation speed (in rpm, from 5,000 to 22,000) and time (from 10 to 20 minutes), using two polymer concentrations (20 and 25%), and a range of oil bath temperatures (from 70 to 90° C.). Examples 7-9 show conditions that did not lead to proper dispersion or precipitation of polymers. For each of examples 7-9, agglomeration of particles occurred during the precipitation step with the yield of the process below 30%. Without wishing to be bound by theory, it is believed that many components are responsible for stabilizing the emulsion under the precipitation conditions of high temperature, for example a combination of mixing intensity, volumetric ratio of the immiscible solvents, homogenization time and/or shear energy input, surfactant concentration, and solution viscosity (e.g., polymer concentration). Specifically, Example 7 did not lead to proper dispersion of the polymers due to an inadequate ratio of aqueous to organic solvent. In contrast, a successful emulsion was prepared in Example 5 when a lower aqueous to organic ratio was used. In Examples 8 and 9, the homogenization time appears to be insufficient, whereas the conditions of Example 1 show that longer homogenization times can provide a stable emulsion. Therefore, Examples 1-9 demonstrate the complexity of the emulsified systems and polymer precipitation. These examples demonstrate the importance of properly matching the intensity of the mixing, the viscosity of the solution (e.g., polymer concentration), and homogenization time to create the desired emulsion. Example 10 shows polymer particles prepared from polycarbonate PC-1.

TABLE 2

| | Ex. 1 | Ex. 2 | Ex. 3 | Ex. 4 | Ex. 5 | Ex. 6 | Ex. 7 | Ex. 8 | Ex. 9 | Ex. 10 |
|---|---|---|---|---|---|---|---|---|---|---|
| Polymer | PC-2 | PC-2 | PC-2 | PC-2 | PC-2 | PC-2 | PC-2 | PC-2 | PC-2 | PC-1 |
| [Polymer] (wt %) | 20 | 20 | 20 | 20 | 25 | 20 | 25 | 20 | 20 | 20 |
| [SDBS] in water (wt %) | 0.5 | 0.5 | 0.5 | 0.5 | 0.5 | 0.5 | 1 | 0.5 | 0.5 | 0.5 |
| Aqueous: organic ratio in emulsion | 0.8 | 0.8 | 0.8 | 1.0 | 0.4 | 0.8 | 0.8 | 0.8 | 0.8 | 1.0 |
| Homogenization tool speed (rpm) | 7,000 | 20,000 | 22,000 | 22,000 | 5,000 | 11,000 | 5,000 | 7,000 | 7,000 | 22,000 |
| Homogenizer tip speed (m/s) | 6.59 | 18.84 | 20.72 | 20.72 | 4.71 | 10.36 | 5.71 | 6.59 | 6.59 | 20.72 |
| Homogenization time (min) | 15 | 10 | 20 | 15 | 10 | 15 | 10 | 10 | 10 | 15 |
| Volume of emulsion (ml) | 1212 | 808 | 1212 | 3538 | 404 | 1212 | 404 | 404 | 808 | 3538 |
| Oil bath temp. (° C.) | 90 | 80 | 90 | 70 | 75 | 90 | 75 | 75 | 75 | 70 |
| Dv10 (μm) | 6.9 | 2.5 | 2.2 | 1.9 | 6.9 | 9.4 | — | — | — | 1.36 |
| Dv50 (μm) | 15.9 | 5.6 | 5.7 | 4.89 | 16.5 | 21.7 | — | — | — | 3.68 |
| Dv90 (μm) | 34.3 | 10.4 | 10.9 | 8.36 | 55.7 | 50.8 | — | — | — | 9.28 |
| Span | 1.72 | 1.41 | 1.53 | 1.32 | 2.96 | 1.91 | — | — | — | 2.15 |

Examples 11-28

Examples 11-20 demonstrate the effect of homogenizer agitation speed and surfactant concentration on Dv50. In these examples, SDBS surfactant was used to prepare the aqueous polymer dispersions of polymers. Two surfactant concentrations, 0.01 wt. % and 0.5 wt. % in water, were used for the following examples. For each example, 200 grams of polymer was dissolved in 800 grams of dichloromethane to produce a 20 wt. % polymer solution. An aqueous to organic phase weight ratio of 0.6 was used to prepare the emulsions. The examples demonstrate the emulsion stability and particle size distribution while being homogenized for long periods of time (e.g., at least 20 minutes) at 2,800 and 15,000 rpm. These two homogenization speeds represent control of the shear rate on the emulsion system. The emulsion was converted to an aqueous polymer dispersion according to the methods discussed above, using Method A for particle precipitation. The experimental variables and results are shown below in Table 3.

TABLE 3

| Ex. | Polymer | [SDBS] (wt %) | Homogenization tool speed (rpm) | Homogenizer tip speed (m/s) | Homogenization Temp. (° C.) | Precip. Water Temp. (° C.) | Dv10 | Dv50 | Dv90 | Dv100 | Span | Yield (%) |
|---|---|---|---|---|---|---|---|---|---|---|---|---|
| 11 | PC-1 | 0.01 | 2,800 | 2.64 | 25 | 75 | 24.9 | 45.9 | 75.4 | 111.0 | 1.10 | 90.2% |
| 12* | PC-1 | 0.01 | 2,800 | 2.64 | 25 | 75 | 26.4 | 49.0 | 80.7 | 117.0 | 1.11 | 94.5% |
| 13 | PC-1 | 0.01 | 2,800 | 2.64 | 25 | 55 | 24.9 | 45.0 | 73.7 | 111.0 | 1.09 | 98.9% |
| 14 | PC-1 | 0.01 | 15,000 | 14.13 | 15 | 75 | 4.7 | 9.9 | 16.8 | 24.1 | 1.22 | 99.0% |
| 15 | PC-1 | 0.01 | 15,000 | 14.13 | 15 | 75 | 4.6 | 9.8 | 16.8 | 24.3 | 1.24 | 98.8% |
| 16 | PEI | 0.01 | 2,800 | 2.64 | 25 | 75 | 32.6 | 70.6 | 122.0 | 186.0 | 1.26 | 85.5% |
| 17* | PEI | 0.01 | 2,800 | 2.64 | 25 | 75 | 35.0 | 70.3 | 119.0 | 175.0 | 1.19 | 80.5% |
| 18 | PEI | 0.01 | 15,000 | 14.13 | 25 | 75 | 3.4 | 15.3 | 30.0 | 51.7 | 1.76 | 96.4% |
| 19 | PEI | 0.01 | 15,000 | 14.13 | 15 | 75 | 4.3 | 15.9 | 29.1 | 45.5 | 1.56 | 97.3% |
| 20 | PEI | 0.01 | 15,000 | 14.13 | 15 | 75 | 4.2 | 15.2 | 28.0 | 41.7 | 1.56 | 98.0% |
| 21 | PC-1 | 0.5 | 2,800 | 2.64 | 25 | 75 | 13.2 | 26.1 | 44.1 | 66.8 | 1.18 | 99.3% |
| 22 | PC-1 | 0.5 | 2,800 | 2.64 | 25 | 75 | 13.4 | 26.5 | 45.1 | 66.9 | 1.20 | 98.8% |
| 23 | PC-1 | 0.5 | 15,000 | 14.13 | 25 | 75 | 2.8 | 6.1 | 10.6 | 16.4 | 1.29 | 98.5% |
| 24 | PC-1 | 0.5 | 15,000 | 14.13 | 25 | 75 | 2.7 | 6.0 | 10.4 | 15.0 | 1.28 | 98.5% |
| 25 | PEI | 0.5 | 2,800 | 2.64 | 25 | 75 | 9.0 | 32.6 | 69.0 | 111.0 | 1.84 | 98.8% |
| 26 | PEI | 0.5 | 2,800 | 2.64 | 25 | 75 | 9.2 | 33.5 | 71.0 | 111.0 | 1.85 | 98.4% |
| 27 | PEI | 0.5 | 15,000 | 14.13 | 25 | 75 | 3.5 | 10.6 | 21.9 | 35.3 | 1.74 | 99.2% |
| 28 | PEI | 0.5 | 15,000 | 14.13 | 25 | 75 | 2.6 | 10.3 | 22.5 | 40.1 | 1.94 | 98.6% |

*Emulsion allowed to stand for >24 hours before precipitation

From the results shown in Table 3 for Examples 11-20, it has now been discovered that Dv50 can be controlled and tuned to a desired target by controlling the homogenization tool speed and the surfactant concentration. For example, comparing examples 16-17 with 18-20, emulsions prepared with PEI and with a surfactant concentration of 0.01 wt % SDBS (relative to the aqueous phase) yield a Dv50 of 70 micrometers or 15 micrometers by controlling the shear stress on the emulsion through dispersion tool speed control at 2,800 rpm and at 15,000 rpm, respectively. Similarly, for polycarbonate emulsion prepared with the same level of surfactant concentration 0.01 wt % SDBS (relative to the aqueous phase), a Dv50 of 45.5 micrometers (examples 11-13) and 9.9 micrometers (examples 14-15) were obtained by similarly controlling the shear stress on the emulsion through dispersion tool speed control at 2,800 rpm and 15,000 rpm, respectively.

Figure 2:
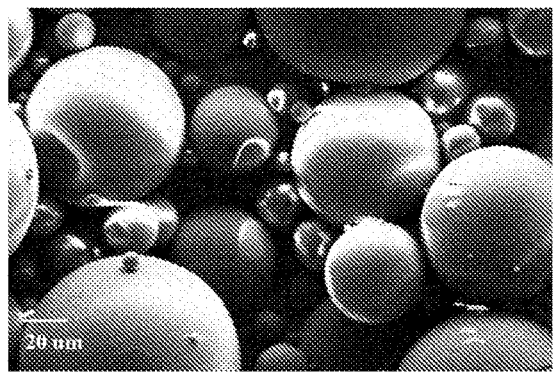
FIG. 2 shows (a) a SEM image of polyetherimide particles at 500× magnification having a Dv50 of 74 μm (scale bar is 20 μm) and (b) a SEM image of polyetherimide particles at 500× magnification having a Dv50 of 16 μm (scale bar is 10 μm).
Figure 2:
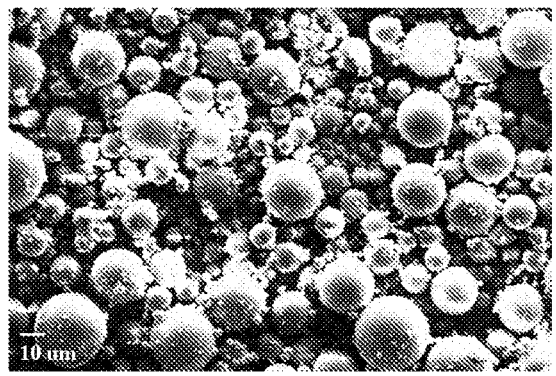

SEM images of powders of polycarbonate PC-1 can be seen in FIG. 1. FIG. 1(a) shows PC-1 particles of example 11 having a Dv50 of about 46 micrometers at 1000× magnification. FIG. 1(b) shows PC-1 particles of example 14 having a Dv50 of about 10 micrometers at 1000× magnification. Similarly, FIG. 2 shows the particle morphology of PEI polymer particles at 500× magnification for particles of example 16 (FIG. 2(a)) and example 17 (FIG. 2(b)). The higher magnification level of 1000× was used for the polycarbonate particles to improve the resolution of the smaller particles of 10 micrometers.

From the results shown in Table 3 for Examples 21-28, it has further been discovered that smaller particle sizes can be achieved through considerable increases in surfactant concentrations under equivalent shear rates. For example, PEI emulsions prepared with surfactant concentrations of 0.5 wt % of SDBS in the aqueous phase exhibited Dv50 of 33 micrometers and 10.5 micrometers when agitated at 2,800 rpm and 15,000 rpm, respectively, compared to a Dv50 of 70 micrometers or 15 micrometers at 2,800 rpm and at 15,000 rpm, respectively, at a surfactant concentration of 0.01 wt %. Similarly, polycarbonate emulsions prepared with the same level of surfactant (0.5 wt %) yielded particles having a Dv50 of 26 micrometers and 6 micrometers when using shear rates of 2,800 rpm or 15,000 rpm, respectively.

Control over the span (particle size distribution) was also examined. The span value was found to increase at higher shear rates (corresponding to a higher homogenization tool speed (rpm)), which was an unexpected result. Higher shear conditions were expected to form a more uniform droplet size distribution, leading to a more uniform particle size distribution. However, the present inventors have unexpectedly discovered that higher shear over short homogenization times can give similar Dv50 particle sizes, but also cause the formation of smaller particles, ultimately leading to an increase in the span. Upon further investigation, it is believed that droplet breakdown at higher shear rates leads to formation of a larger number of satellite droplets, thus increasing the span of the distribution. Table 4 shows two different particle size spans that could be produced at the same Dv50, by controlling the shear rate and homogenizer tool energy input per unit volume of emulsion. The homogenizer tool energy input was measured using a watts-up portable power meter. Watts-up pro data logger software was used for data acquisition. A surfactant concentration of 0.01 wt % based on the weight of the aqueous phase was used for each of the Example of Table 4.

TABLE 4

| Ex. | Homogenizer tool speed (rpm) | Homogenizer tip speed (m/s) | Homogenization Time (s) | Homogenizer tool energy Input/volume (J/cm³) | Dv50 (μm) | Span | Yield (%) |
|---|---|---|---|---|---|---|---|
| 29 | 5,000 | 4.71 | 300 | 13.3 | 60.8 | 1.18 | 96.0% |
| 30 | 10,000 | 9.42 | 30 | 3.4 | 61.0 | 1.56 | 80.9% |
| 31 | 10,000 | 9.42 | 1200 | 151 | 21.1 | 1.61 | 99.1% |
| 32 | 15,000 | 14.13 | 60 | 14.1 | 21.2 | 1.83 | 95.4% |

Figure 3:
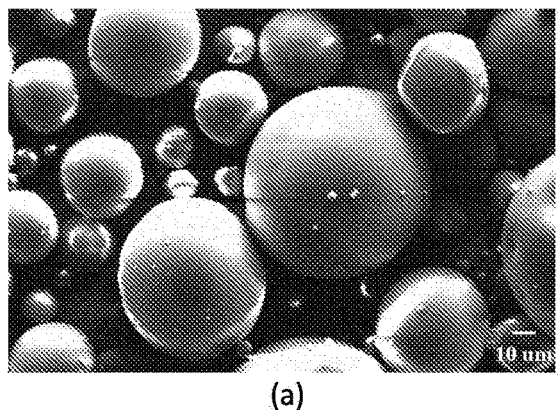
FIG. 3 shows (a) a SEM image of polyetherimide particles at 500× magnification having a Dv50 of 60.8 μm and a span of 1.18 (scale bar is 10 μm) and (b) a SEM image of polyetherimide particles at 500× magnification having a Dv50 of 61 μm and a span of 1.56 (scale bar is 10 μm).
Figure 3:
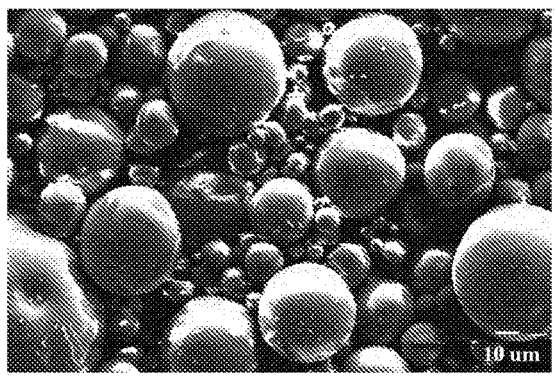

As shown in Table 4, the PEI particle Dv50 and span could be controlled by varying the homogenization tool speed and energy input/volume to achieve a lower span at the same Dv50, or the same span at different Dv50. Specifically, particles were produced via 300 seconds of homogenization at 5,000 rpm in Example 29. In Example 30, particles were produced by homogenization at 10,000 rpm for 30 seconds. Both of these process conditions successfully produced Dv50 particle sizes of about 61 micrometers, while the span was lower when the lower shear was used. The yields in both examples 29 and 30 were also >80%. SEM images of these particles are shown in FIG. 3. FIG. 3(a) shows the particles of example 29 at 500× magnification, and FIG. 3(b) shows the particles of example 30 at 500× magnification. Scale bars are 10 micrometers.

Figure 4:
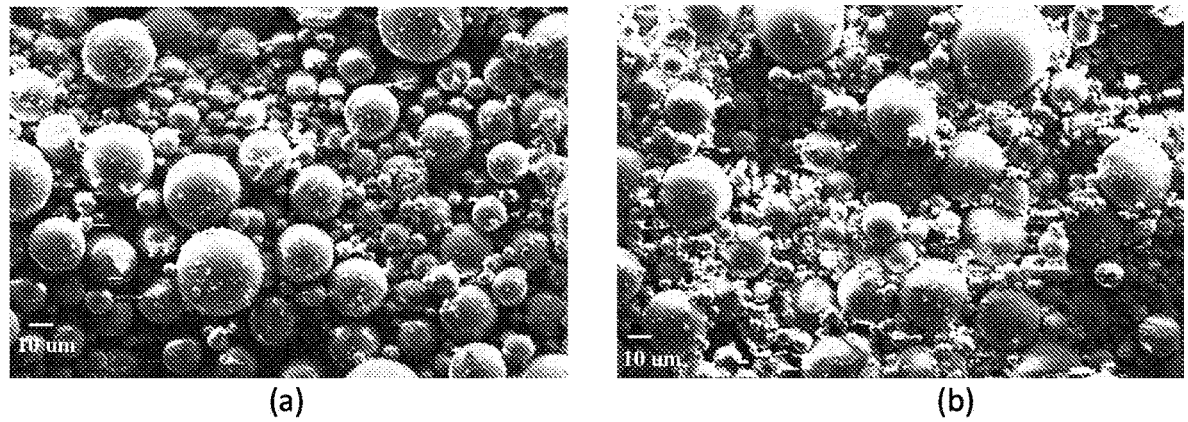
FIG. 4 shows (a) a SEM image of polyetherimide particles at 500× magnification having a Dv50 of 21.1 micrometers and a span of 1.61 (scale bar is 10 μm) and (b) a SEM image of polyetherimide particles at 500× magnification having a Dv50 of 21.2 micrometers and a span of 1.83.

Similar results were obtained to produce a smaller Dv50 particle (about 21 micrometers), as shown in examples 31 and 32. A lower homogenization tool speed gave a lower span while maintaining substantially high process yields of 95% and higher. FIG. 4 shows the SEM images of example 31 (FIG. 4(a)) and example 32 (FIG. 4(b)). As shown in FIG. 4, the span of the particle size was increased while the Dv50 of about 21 micrometers was maintained.

Thus, another opportunity for tailoring particle size is observed in the results presented in Table 4, where two different Dv50 particle sizes of 61 and 21 micrometers can be produced while maintaining the span in the range of 1.55 to 1.62. This provides a multi-dimensional particle size distribution tenability of the polymer particles.

Pilot Plant Scale Up

Micronized polymer particles were successfully prepared at a pilot scale unit by controlling the surfactant concentration and organic phase viscosity through polymer concentration.

PEI polymer pellets were completely dissolved in dichloromethane in a 300 gallon glass-lined tank equipped with a pitched blade turbine agitator (referred in as the "emulsion tank" or "emulsion vessel"). The emulsion tank was charged with 70 gallons of dichloromethane and 37.5 pounds of PEI with 55 gallons of deionized water and 2.25 pounds of aqueous solution of SDBS (40 wt % SDBS in water). The contents of the emulsion tank were mixed using the agitator assembly to dissolve the polymer in dichloromethane as well as to homogenously disperse the SDBS solution in the DI water. Complete polymer pellet dissolution was confirmed by the absence of any visibly suspended particles. Emulsification was then achieved in a second step by subjecting the contents of the emulsion tank to a high level of shear force by means of a centrifugal pump installed on the emulsion tank. The contents of the emulsion tank were recirculated through this pump in a close recycle loop on the emulsion tank.

Figure 5:
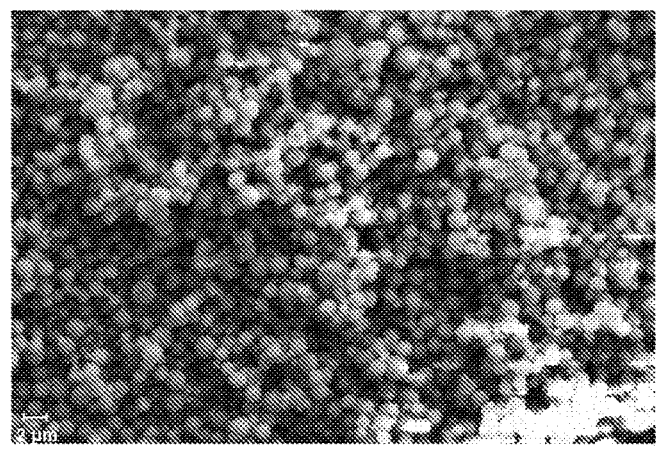
FIG. 5 shows a SEM image of polyetherimide particles.

In a second 300 gallon tank (referred to as the "precipitation tank" or "precipitation vessel"), which is also equipped with a pitched blade turbine agitator and a heating jacket with temperature control, 80 gallons of deionized water was added. To this, 1.66 pounds of 40 wt % SDBS aqueous solution was added, followed by 30 grams of anti-foam agent-1 to provide an anti-foam agent concentration of 100 ppm. The temperature of the precipitation tank water was raised to a target temperature of 75° C., and was maintained within 2° C. of this target. To control the foam build up on top of the hot water surface as well as to constantly sweep off methylene chloride vapor from the headspace, one or more nitrogen sweeps were successfully employed. Once the water temperature was steady at 75° C., 50 gallons of the emulsion was transferred from the emulsion vessel to the precipitation tank using a controlled addition rate. After complete transfer of the emulsion, the precipitation vessel was held at 75° C. for at least 30 minutes to remove any residual dichloromethane. The resulting aqueous dispersion was passed through a 150 micrometer sieve. The aqueous dispersion was then filtered under vacuum using a microfiber filter paper having 0.7 micrometer pore size. The particles were washed well with deionized water, isolated, and dried in a vacuum oven at 80° C. overnight. The size and size distribution (span) of the particles was characterized as described above. The results are shown in Table 5 as example 33. An SEM image of PEI particles produced as described above is shown in FIG. 5 (scale bar is 2 micrometers).

TABLE 5

| Ex. | [Polymer] (wt %) | Aqueous: organic ratio in emulsion | [Surfactant] in aqueous phase (wt %) | Hot water temp. (° C.) | Span | Dv10 (μm) | Dv50 (μm) | Dv90 (μm) |
|---|---|---|---|---|---|---|---|---|
| 33 | 5 | 0.6 | 0.2 | 75 | 2.85 | 0.08 | 1.71 | 4.97 |

This disclosure further encompasses the following aspects.

Aspect 1: A process for the manufacture of thermoplastic polymer particles, the process comprising combining a first solution comprising a polyetherimide, a polycarbonate, or a combination thereof and an organic solvent with an aqueous solution comprising an effective amount of a surfactant to provide a mixture; agitating the mixture using a shear force generating device at a preselected peripheral rotational speed to provide an emulsion; heating the emulsion to a temperature of greater than 35° C., preferably greater than 50 to 99° C. to remove the organic solvent and provide an aqueous polymer dispersion comprising thermoplastic polymer particles; and recovering the thermoplastic polymer particles from the aqueous polymer dispersion in a yield of greater than 80%; wherein when the preselected peripheral rotational speed is 2 to less than 14 m/s, preferably 2 to 3.3 m/s, and the effective amount of the surfactant is 0.005 to 0.05 weight percent, based on the weight of the aqueous solution, the thermoplastic polymer particles are spherical particles having a Dv50 diameter of 35 to 80 micrometers; and a particle size distribution span of 1.0 to 1.5; when the preselected peripheral rotational speed is 14 to 23.5 m/s, preferably 14 to 19 m/s, and the effective amount of the surfactant is 0.005 to 0.05 weight percent, based on the weight of the aqueous solution, the thermoplastic polymer particles are spherical particles having a Dv50 diameter of 5 to 25 micrometers; and a particle size distribution span of 1.1 to 2.0; when the preselected peripheral rotational speed is 2 to less than 14 m/s, preferably 2 to 3.3 m/s, and effective amount of the surfactant is greater than 0.05 to 1 weight percent, based on the weight of the aqueous solution, the thermoplastic polymer particles are spherical particles having a Dv50 diameter of 15 to 40 micrometers; and a particle size distribution span of 1.0 to 2.0; and when the preselected peripheral rotational speed is 14 to 23.5 m/s, preferably 14 to 19 m/s, and the effective amount of the surfactant is greater than 0.05 to 1 weight percent, based on the weight of the aqueous solution, the thermoplastic polymer particles are spherical particles having a Dv50 diameter of 1 to 20 micrometers; and a particle size distribution span of 1.1 to 2.0.

Aspect 2: The process of aspect 1, wherein the first solution comprises a polyetherimide.

Aspect 3: The process of aspect 1, wherein the first solution comprises a polycarbonate.

Aspect 4: The process of any one or more of aspects 1 to 3, wherein the first solution comprises the polyetherimide, the polycarbonate, or combination thereof in an amount of 3 to 30 weight percent, preferably 10 to 30 weight percent, more preferably 15 to 25 weight percent, even more preferably 20 to 25 weight percent, based on the total weight of the first solution.

Aspect 5: The process of any one or more of aspects 1 to 4, wherein the emulsion comprises water in a water:organic solvent weight ratio of greater than or equal to 0.2, preferably 0.4 to 3, more preferably 0.5 to 1.5, even more preferably 0.6 to 1.25.

Aspect 6: The process of any one or more of aspects 1 to 5, wherein heating the emulsion comprises transferring the emulsion into a receiving water at a temperature of greater than 35° C., preferably greater than 50 to 99° C. to remove the organic solvent, preferably wherein the transferring comprises adding the emulsion dropwise to the receiving water or spraying the emulsion into the receiving water.

Aspect 7: The process of any one or more of aspects 1 to 5, wherein heating the emulsion is to a temperature of greater than 40 to 99° C., preferably greater than 50 to 90° C., more preferably greater than 50 to 85° C.

Aspect 8: The process of any one or more of aspects 1 to 7, wherein recovering the thermoplastic polymer particles comprises filtering the aqueous dispersion to form a wet cake.

Aspect 9: The process of aspect 8, further comprising washing the wet cake with water, preferably deionized water at a temperature of 25 to 100° C.; and drying the wet cake, preferably drying the wet cake under heat, vacuum, or both.

Aspect 10: The process of any one or more of aspects 1 to 9, wherein the organic solvent has a boiling point that is less than 100° C. and is substantially immiscible with water, preferably wherein the organic solvent comprises methylene chloride, chloroform, dichloroethane, or a combination comprising at least one of the foregoing, more preferably wherein the organic solvent comprises methylene chloride.

Aspect 11: The process of any one or more of aspects 1 to 10, wherein the surfactant comprises an anionic surfactant, preferably wherein the anionic surfactant is a ($C_{8-36}$alkyl)benzene sulfonate, ($C_{8-36}$alkyl) sulfonate, mono- or di($C_{8-36}$alkyl) sulfosuccinate, ($C_{8-36}$alkyl ether) sulfate, ($C_{8-36}$)alkyl ether sulfonate, perfluoro($C_{2-12}$alkyl) sulfate, or perfluoro($C_{2-12}$carboxylate), more preferably wherein the anionic surfactant is sodium dodecyl sulfate, sodium lauryl sulfate, sodium laureth sulfate, sodium dioctyl sulfosuccinate, sodium dihexyl sulfosuccinate, perfluorooctane sulfonate, perfluorooctanoic acid, or sodium dodecylbenzenesulfonate, most preferably wherein the anionic surfactant is sodium dodecylbenzenesulfonate.

Aspect 12: The process of any one or more of aspects 1 to 11, wherein agitating the emulsion is for a time of 0.5 to 30 minutes, or 1 to 25 minutes, or 5 to 25 minutes, or 10 to 20 minutes; or 5 minutes to 24 hours, or 30 minutes to 24 hours, or 1 to 24 hours, or 3 to 10 hours.

Aspect 13: The process of any one or more of aspects 1 to 11, wherein the first solution further comprises an additive comprising a particulate filler, antioxidant, heat stabilizer, light stabilizer, ultraviolet light stabilizer, UV absorbing additive, NIR absorbing additive, IR absorbing additive, plasticizer, lubricant, release agent, antistatic agent, anti-fog agent, antimicrobial agent, colorant, laser marking additive, surface effect additive, radiation stabilizer, flame retardant, anti-drip agent, a fragrance, a fiber, or a combination comprising at least one of the foregoing, preferably a colorant; and the thermoplastic polymer particles recovered from the aqueous polymer dispersion comprise the additive.

Aspect 14: The process of any one or more of aspects 1 to 13, wherein the preselected peripheral rotational speed is 2 to 3.3 m/s, and the effective amount of the surfactant is 0.005 to 0.05 weight percent, based on the weight of the aqueous solution, and the thermoplastic polymer particles are spherical particles having a Dv10 diameter of 15 to 45 micrometers; a Dv50 diameter of 35 to 80 micrometers; a Dv90 diameter of 65 to 130 micrometers; and a particle size distribution span of 1.0 to 1.8.

Aspect 15: The process of any one or more of aspects 1 to 13, wherein the preselected peripheral rotational speed is 14 to 19 m/s, and the effective amount of the surfactant is 0.005 to 0.05 weight percent, based on the weight of the aqueous solution, and the thermoplastic polymer particles are spherical particles having a Dv10 diameter of 1 to 10 micrometers; a Dv50 diameter of 3 to 30 micrometers; a Dv90 diameter of 5 to 50 micrometers; and a particle size distribution span of 1.1 to 2.8.

Aspect 16: The process of any one or more of aspects 1 to 13, wherein the preselected peripheral rotational speed is 2 to 3.3 m/s, and the effective amount of the surfactant is 0.05 to 1 weight percent, based on the weight of the aqueous solution, and the thermoplastic polymer particles are spherical particles having a Dv10 diameter of 5 to 25 micrometers; a Dv50 diameter of 15 to 40 micrometers; a Dv90 diameter of 30 to 80 micrometers; and a particle size distribution span of 1.1 to 2.4.

Aspect 17: The process of any one or more of aspects 1 to 13, wherein the preselected peripheral rotational speed is 14 to 19 m/s, and the effective amount of the surfactant is 0.05 to 1 weight percent, based on the weight of the aqueous solution, and the thermoplastic polymer particles are spherical particles having a Dv10 diameter of 1 to 5 micrometers; a Dv50 diameter of 2 to 20 micrometers; a Dv90 diameter of 4 to 30 micrometers; and a particle size distribution span of 1.2 to 2.5.

Aspect 18: Thermoplastic polymer particles prepared according to the process of any one or more of aspects 1 to 17.

Aspect 19: An article prepared from the thermoplastic polymer particles of aspect 18.

The compositions, methods, and articles can alternatively comprise, consist of, or consist essentially of, any appropriate components or steps herein disclosed. The compositions, methods, and articles can additionally, or alternatively, be formulated so as to be devoid, or substantially free, of any steps, components, materials, ingredients, adjuvants, or species that are otherwise not necessary to the achievement of the function or objectives of the compositions, methods, and articles.

All ranges disclosed herein are inclusive of the endpoints, and the endpoints are independently combinable with each other. "Combinations" is inclusive of blends, mixtures, alloys, reaction products, and the like. The terms "first," "second," and the like, do not denote any order, quantity, or importance, but rather are used to distinguish one element from another. The terms "a" and "an" and "the" do not denote a limitation of quantity, and are to be construed to cover both the singular and the plural, unless otherwise indicated herein or clearly contradicted by context. "Or" means "and/or" unless clearly stated otherwise. Reference throughout the specification to "some embodiments", "an embodiment", and so forth, means that a particular element described in connection with the embodiment is included in at least one embodiment described herein, and may or may not be present in other embodiments. In addition, it is to be understood that the described elements may be combined in any suitable manner in the various embodiments.

Unless defined otherwise, technical and scientific terms used herein have the same meaning as is commonly understood by one of skill in the art to which this application belongs. All cited patents, patent applications, and other references are incorporated herein by reference in their entirety. However, if a term in the present application contradicts or conflicts with a term in the incorporated reference, the term from the present application takes precedence over the conflicting term from the incorporated reference.

The term "alkyl" means a branched or straight chain, unsaturated aliphatic hydrocarbon group, e.g., methyl, ethyl, n-propyl, i-propyl, n-butyl, s-butyl, t-butyl, n-pentyl, s-pentyl, and n- and s-hexyl. "Alkenyl" means a straight or branched chain, monovalent hydrocarbon group having at least one carbon-carbon double bond (e.g., ethenyl (—HC=CH$_2$)). "Alkoxy" means an alkyl group that is linked via an oxygen (i.e., alkyl-O—), for example methoxy, ethoxy, and sec-butyloxy groups. "Alkylene" means a straight or branched chain, saturated, divalent aliphatic hydrocarbon group (e.g., methylene (—CH$_2$—) or, propylene (—(CH$_2$)$_3$—)). "Cycloalkylene" means a divalent cyclic alkylene group, —C$_n$H$_{2n-x}$, wherein x is the number of hydrogens replaced by cyclization(s). "Cycloalkenyl" means a monovalent group having one or more rings and one or more carbon-carbon double bonds in the ring, wherein all ring members are carbon (e.g., cyclopentyl and cyclohexyl). "Aryl" means an aromatic hydrocarbon group containing the specified number of carbon atoms, such as phenyl, tropone, indanyl, or naphthyl. The prefix "halo" means a group or compound including one more of a fluoro, chloro, bromo, or iodo substituent. A combination of different halo groups (e.g., bromo and fluoro), or only chloro groups can be present. The prefix "hetero" means that the compound or group includes at least one ring member that is a heteroatom (e.g., 1, 2, or 3 heteroatom(s)), wherein the heteroatom(s) is each independently N, O, S, Si, or P. "Substituted" means that the compound or group is substituted with at least one (e.g., 1, 2, 3, or 4) substituents that can each independently be a C$_{1-9}$ alkoxy, a C$_{1-9}$ haloalkoxy, a nitro (—NO$_2$), a cyano (—CN), a C$_{1-6}$ alkyl sulfonyl (—S(=O)$_2$-alkyl), a C$_{6-12}$ aryl sulfonyl (—S(=O)$_2$-aryl)a thiol (—SH), a thiocyano (—SCN), a tosyl (CH$_3$C$_6$H$_4$SO$_2$—), a C$_{3-12}$ cycloalkyl, a C$_{2-12}$ alkenyl, a C$_{5-12}$ cycloalkenyl, a C$_{6-12}$ aryl, a C$_{7-13}$ arylalkylene, a C$_{4-12}$ heterocycloalkyl, and a C$_{3-12}$ heteroaryl instead of hydrogen, provided that the substituted atom's normal valence is not exceeded. The number of carbon atoms indicated in a group is exclusive of any substituents. For example —CH$_2$CH$_2$CN is a C$_2$ alkyl group substituted with a nitrile.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications variations, improvements, and substantial equivalents.

What is claimed is:

1. A process for the manufacture of thermoplastic polymer particles, the process comprising
    combining a first solution comprising a polyetherimide, a polycarbonate, or a combination thereof and an organic solvent with an aqueous solution comprising an effective amount of a surfactant to provide a mixture;
    agitating the mixture using a shear force generating device at a preselected peripheral rotational speed to provide an emulsion;
    heating the emulsion to a temperature of greater than 35° C. to remove the organic solvent and provide an aqueous polymer dispersion comprising thermoplastic polymer particles; and
    recovering the thermoplastic polymer particles from the aqueous polymer dispersion in a yield of greater than 80%;
    wherein
        when the preselected peripheral rotational speed is 2 to less than 14 m/s, and the effective amount of the surfactant is 0.005 to 0.05 weight percent, based on the weight of the aqueous solution, the thermoplastic polymer particles are spherical particles having
            a Dv50 diameter of 35 to 80 micrometers; and
            a particle size distribution span of 1.0 to 1.5;
        when the preselected peripheral rotational speed is 14 to 23.5 m/s, and the effective amount of the surfactant is 0.005 to 0.05 weight percent, based on the weight of the aqueous solution, the thermoplastic polymer particles are spherical particles having
            a Dv50 diameter of 5 to 25 micrometers; and
            a particle size distribution span of 1.1 to 2.0;
        when the preselected peripheral rotational speed is 2 to less than 14 m/s, and the effective amount of the surfactant is greater than 0.05 to 1 weight percent, based on the weight of the aqueous solution, the thermoplastic polymer particles are spherical particles having
            a Dv50 diameter of 15 to 40 micrometers; and
            a particle size distribution span of 1.0 to 2.0; and
        when the preselected peripheral rotational speed is 14 to 23.5 m/s, and the effective amount of the surfactant is greater than 0.05 to 1 weight percent, based on the weight of the aqueous solution, the thermoplastic polymer particles are spherical particles having
            a Dv50 diameter of 1 to 20 micrometers; and
            a particle size distribution span of 1.1 to 2.0.

2. The process of claim 1, wherein the first solution comprises a polyetherimide.

3. The process of claim 1, wherein the first solution comprises a polycarbonate.

4. The process of claim 1, wherein the first solution comprises the polyetherimide, the polycarbonate, or combination thereof in an amount of 3 to 30 weight percent, based on the total weight of the first solution.

5. The process of claim 1, wherein the emulsion comprises water in a water:organic solvent weight ratio of greater than or equal to 0.2.

6. The process of claim 1, wherein heating the emulsion comprises transferring the emulsion into a receiving water at a temperature of greater than 35° C. to remove the organic solvent.

7. The process of claim 1, wherein heating the emulsion is to a temperature of greater than 40 to 99° C.

8. The process of claim 1, wherein recovering the thermoplastic polymer particles comprises filtering the aqueous dispersion to form a wet cake.

9. The process of claim 8, further comprising
washing the wet cake with water, preferably deionized water at a temperature of 25 to 100° C.; and
drying the wet cake, preferably drying the wet cake under heat, vacuum, or both.

10. The process of claim 1, wherein the organic solvent has a boiling point that is less than 100° C. and is substantially immiscible with water.

11. The process of claim 1, wherein the surfactant comprises an anionic surfactant.

12. The process of claim 1, wherein agitating the emulsion is for a time of
0.5 to 30 minutes; or
5 minutes to 24 hours.

13. The process of claim 1, wherein
the first solution further comprises an additive comprising a particulate filler, antioxidant, heat stabilizer, light stabilizer, ultraviolet light stabilizer, UV absorbing additive, NIR absorbing additive, IR absorbing additive, plasticizer, lubricant, release agent, antistatic agent, anti-fog agent, antimicrobial agent, colorant, laser marking additive, surface effect additive, radiation stabilizer, flame retardant, anti-drip agent, a fragrance, a fiber, or a combination comprising at least one of the foregoing, preferably a colorant; and
the thermoplastic polymer particles recovered from the aqueous polymer dispersion comprise the additive.

14. The process of claim 1, wherein the preselected peripheral rotational speed is 2 to 3.3 m/s, and the effective amount of the surfactant is 0.005 to 0.05 weight percent, based on the weight of the aqueous solution, and the thermoplastic polymer particles are spherical particles having
a Dv10 diameter of 15 to 45 micrometers;
a Dv50 diameter of 35 to 80 micrometers;
a Dv90 diameter of 65 to 130 micrometers; and
a particle size distribution span of 1.0 to 1.8.

15. The process of claim 1, wherein the preselected peripheral rotational speed is 14 to 19 m/s, and the effective amount of the surfactant is 0.005 to 0.05 weight percent, based on the weight of the aqueous solution, and the thermoplastic polymer particles are spherical particles having
a Dv10 diameter of 1 to 10 micrometers;
a Dv50 diameter of 3 to 30 micrometers;
a Dv90 diameter of 5 to 50 micrometers; and
a particle size distribution span of 1.1 to 2.8.

16. The process of claim 1, wherein the preselected peripheral rotational speed is 2 to 3.3 m/s, and the effective amount of the surfactant is 0.05 to 1 weight percent, based on the weight of the aqueous solution, and the thermoplastic polymer particles are spherical particles having
a Dv10 diameter of 5 to 25 micrometers;
a Dv50 diameter of 15 to 40 micrometers;
a Dv90 diameter of 30 to 80 micrometers; and
a particle size distribution span of 1.1 to 2.4.

17. The process of claim 1, wherein the preselected peripheral rotational speed is 14 to 19 m/s, and the effective amount of the surfactant is 0.05 to 1 weight percent, based on the weight of the aqueous solution, and the thermoplastic polymer particles are spherical particles having
a Dv10 diameter of 1 to 5 micrometers;
a Dv50 diameter of 2 to 20 micrometers;
a Dv90 diameter of 4 to 30 micrometers; and
a particle size distribution span of 1.2 to 2.5.

18. Thermoplastic polymer particles prepared according to the process of claim 1.

19. An article prepared from the thermoplastic polymer particles of claim 18.

* * * * *